US010187626B2

(12) United States Patent
Shechtman et al.

(10) Patent No.: US 10,187,626 B2
(45) Date of Patent: Jan. 22, 2019

(54) APPARATUSES AND METHODS FOR THREE-DIMENSIONAL IMAGING OF AN OBJECT

(71) Applicant: The Board of Trustees of the Leland Stanford Junior University, Stanford, CA (US)

(72) Inventors: Yoav Shechtman, Santa Clara, CA (US); William E. Moerner, Stanford, CA (US); Lucien Weiss, Los Angeles, CA (US); Steffen J. Sahl, Göttingen (DE)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 285 days.

(21) Appl. No.: 15/096,122

(22) Filed: Apr. 11, 2016

(65) Prior Publication Data
US 2016/0301915 A1    Oct. 13, 2016

Related U.S. Application Data

(60) Provisional application No. 62/146,024, filed on Apr. 10, 2015.

(51) Int. Cl.
*H04N 13/218* (2018.01)
*G02B 21/00* (2006.01)
(Continued)

(52) U.S. Cl.
CPC ......... *H04N 13/218* (2018.05); *G02B 21/008* (2013.01); *G02B 21/0028* (2013.01);
(Continued)

(58) Field of Classification Search
CPC combination set(s) only.
See application file for complete search history.

(56) References Cited

U.S. PATENT DOCUMENTS 6,330,388 B1 * 12/2001 Bendett ..................... C03C 4/00
                                                                   385/132
7,342,717 B1    3/2008 Hausmann et al.
(Continued)

OTHER PUBLICATIONS

Shechtman, Yoav, et al. "Optimal point spread function design for 3D imaging." Physical review letters 113.13 (2014): 133902. Abstract only.
(Continued)

*Primary Examiner* — Tsung-Yin Tsai
(74) *Attorney, Agent, or Firm* — Crawford Maunu PLLC

(57) ABSTRACT

Various embodiments include an apparatus including a phase mask and circuitry. The phase mask is configured and arranged with optics in an optical path to modify a shape of light, passed from an object. The shape modification characterizes the light as having two lobes with a lateral distance that changes along a line, having a first orientation, as a function of an axial proximity of the object to a focal plane, and with the line having a different orientation depending on whether the object is above or below the focal plane. The circuitry is configured and arranged to generate a three-dimensional image from light detected at the image plane, by using the modified shape to provide depth-based characteristics of the object.

24 Claims, 22 Drawing Sheets

(51) Int. Cl.
  *G02B 26/06* (2006.01)
  *H04N 13/161* (2018.01)
  *H04N 13/214* (2018.01)
  *H04N 13/271* (2018.01)
(52) U.S. Cl.
  CPC ..... *G02B 21/0032* (2013.01); *G02B 21/0056* (2013.01); *G02B 21/0064* (2013.01); *G02B 26/06* (2013.01); *H04N 13/161* (2018.05); *H04N 13/214* (2018.05); *H04N 13/271* (2018.05)

(56) References Cited

U.S. PATENT DOCUMENTS

| | | | | |
|---|---|---|---|---|
| 7,538,764 | B2* | 5/2009 | Salomie | G06T 17/20 |
| | | | | 345/418 |
| 7,705,970 | B2* | 4/2010 | Piestun | G01C 3/08 |
| | | | | 356/4.01 |
| 8,558,873 | B2 | 10/2013 | McEldowney | |
| 8,586,945 | B2 | 11/2013 | Reuss et al. | |
| 8,608,314 | B2 | 12/2013 | Yoon et al. | |
| 9,075,010 | B2 | 7/2015 | Moerner et al. | |
| 9,881,355 | B2* | 1/2018 | Piestun | G01N 21/6456 |
| 2003/0047688 | A1* | 3/2003 | Faris | B01L 3/502792 |
| | | | | 250/432 R |
| 2003/0072528 | A1* | 4/2003 | Jacobowitz | G02B 6/02133 |
| | | | | 385/37 |
| 2005/0046865 | A1* | 3/2005 | Brock | G01B 9/02057 |
| | | | | 356/495 |
| 2006/0078113 | A1* | 4/2006 | Javidi | G03H 1/0866 |
| | | | | 380/210 |
| 2006/0126921 | A1 | 6/2006 | Shorte et al. | |
| 2006/0274394 | A1 | 12/2006 | Riley et al. | |
| 2007/0146873 | A1 | 6/2007 | Ortyn et al. | |
| 2009/0161519 | A1* | 6/2009 | Yamamoto | G11B 7/0065 |
| | | | | 369/103 |
| 2010/0278400 | A1* | 11/2010 | Piestun | G01N 21/6456 |
| | | | | 382/128 |
| 2011/0002530 | A1 | 1/2011 | Zhuang et al. | |
| 2011/0025831 | A1 | 2/2011 | Bewersdorf et al. | |
| 2011/0174986 | A1 | 7/2011 | Kempe et al. | |
| 2011/0249866 | A1* | 10/2011 | Piestun | H04N 13/204 |
| | | | | 382/103 |
| 2013/0147925 | A1 | 6/2013 | Lew et al. | |
| 2015/0192510 | A1* | 7/2015 | Piestun | G01B 11/002 |
| | | | | 702/151 |
| 2015/0323787 | A1* | 11/2015 | Yuste | G02B 27/0075 |
| | | | | 348/79 |
| 2016/0125610 | A1* | 5/2016 | Piestun | H04N 13/204 |
| | | | | 348/46 |
| 2016/0231553 | A1* | 8/2016 | Piestun | G02B 21/367 |
| 2016/0301914 | A1 | 10/2016 | Schechtman et al. | |

OTHER PUBLICATIONS

Shechtman, Yoav, et al. "Precise Three-Dimensional Scan-Free Multiple-Particle Tracking over Large Axial Ranges with Tetrapod Point Spread Functions." Nano letters 15.6 (2015): 4194-4199.
Broeken, Jordi, Bernd Rieger, and Sjoerd Stallinga. "Simultaneous measurement of position and color of single fluorescent emitters using diffractive optics." Optics letters 39.11 (2014): 3352-3355.
Shechtman, Y., et al. "Optimal point spread function design for 3D imaging." Physical review letters 113.13 (2014): 133902-133902.
Jia, S., J. C. Vaughan, and X. Zhuang. "Isotropic 3D Super-resolution Imaging with a Self-bending Point Spread Function." Nature photonics 8 (2013): 302-306.
Backlund, M. P., et al. "Correlations of three-dimensional motion of chromosomal loci in yeast revealed by the double-helix point spread function microscope." Molecular biology of the cell 25.22 (2014): 3619-3629.
Halpern, A. R., Howard, M. A & Vaughan, J. C. Point by Point: An Introductory Guide to Sample Preparation for Single-Molecule, Super-Resolution Fluorescence Microscopy. Curr Protoc Chem Biol, 103-120 (2015).
Zhang, Z., Kenny, S. J., Hauser, M., Li, W. & Xu, K. Ultrahigh-throughput single-molecule spectroscopy and spectrally resolved super-resolution microscopy. Nature methods 12, 902 (2015).
Pavani, Sri Rama Prasanna, et al. "Three-dimensional, single-molecule fluorescence imaging beyond the diffraction limit by using a double-helix point spread function." PNAS 106.9 (2009): 2995-2999.
Thomann, D., et al. "Automatic fluorescent tag detection in 3D with super-resolution: application to the analysis of chromosome movement." Journal of Microscopy 208.Pt 1 (2002): 49-64.
Juette, Manuel F., et al. "Three-dimensional sub-100 nm resolution fluorescence microscopy of thick samples."Nature Methods 5.6 (2008): 527.
E. Toprak et al., "Defocused orientation and position imaging (DOPI) of myosin V," PNAS 103, 6495-6199 (2006).
T. Gould et al., "Nanoscale imaging of molecular positions and anisotropies," Nature Methods 5, 1027-1030 (2008).
M. Backlund et al., "Simultaneous, accurate measurement of the 3D position and orientation of single molecules," PNAS 109, 19087-19092, (2012).
Davis et al., "Interferometric Synthetic Aperture Microscopy: Computed Imaging for Scanned Coherent Microscopy", Sensors 2008, 8, pp. 3903-3931.
Backlund et al., "The Role of Molecular Dipole Orientation in Single-Molecule Fluorescence Microscopy and Implications for Super-Resolution Imaging" ChemPhysChem 2014, 15, 587-599.
Toprak et al., "New Fluorescent Tools for Watching Nanometer-Scale Conformational Changes of Single Molecules Annual Review of Biophysics and Biomolecular Structure," vol. 36: 349-369 (Volume publication date Jun. 2007).
Backlund et al., "The Double-helix point spread function enables precise and accurate measurement of 3D single-molecule localization and orientation", Proc Soc Photo Opt Instrum Eng. Feb. 22, 2013; 8590.
M. Thompson et al., "Three-dimensional mRNA particles in *Saccharomyces cerevisiae* using a double helix point spread function", PNAS 107, 17864-17871 (2010).
A. Gahlmann et al., "Quantitative Multicolor Subdiffraction Imaging of Bacterial Protein Ultrastructures in Three Dimensions", Nano Lett. 13, 987-993 (2013) Abstract.
T. Ha et al.,"Hindered Rotational Diffusion and Rotational Jumps of Single Molecules" PRL 80, 2093-2096 (1998). Abstract Only.
H. Sosa & E. Peterman et al., "ADP-induced rocking of the kinesin motor domain revealed by single-molecule luorescence polarization microscopy" Nature Struct. Bio. 8, 540-544 (2001).
A. Backer et al., "Single-molecule orientation measurements with a quadrated puupil", Optics Lett., 38, 1521-1523 (2013).
Tseng, "Ultrafast Coherent Control Spectroscopy" dissertation, Stony Brook University, 2012.
Engelhardt, Johann, et al. "Molecular orientation affects localization accuracy in superresolution far-field fluorescence microscopy." Nano letters 11.1 (2010): 209-213.
M. Lew & M. Backlund, "Rotational Mobility of Single Molecules Affects Localization Accuracy in Super-Resolution Fluorescence Microscopy" Nano Lett. 13, 3967-3972 (2013).
Böhmer, Martin, and Jörg Enderlein. "Orientation imaging of single molecules by wide-field epifluorescence microscopy." JOSA B 20.3 (2003): 554-559.
Axelrod, Daniel. "Fluorescence excitation and imaging of single molecules near dielectric-coated and bare surfaces: a theoretical study." Journal of microscopy 247.2 (2012): 147-160.
H. D. Lee, S. J. Sahl, M. D. Lew and W. E Moerner, "The double-helix microscope super-resolves extended biological structures by localizing single blinking molecules in three dimensions with nanoscale precision" Appl. Phys. Left. 100, 153701 (2012).
Lew, Matthew D., Alexander RS von Diezmann, and W. E Moerner. "Easy-DHPSF open-source software for three-dimensional localization of single molecules with precision beyond the optical diffraction limit." Protocol exchange 2013 (2013).

(56) References Cited

OTHER PUBLICATIONS

Sahl, S. J., and W. E. Moerner. "Super-resolution fluorescence imaging with single molecules." Current opinion in structural biology 23.5 (2013): 778-787.
Rust, Michael J., Mark Bates, and Xiaowei Zhuang. "Sub-diffraction-limit imaging by stochastic optical reconstruction microscopy (Storm)." Nature Methods 3.10 (2006).
Stallinga, Sjoerd, and Bernd Rieger. "Accuracy of the Gaussian Point Spread Function model in 2D localization microscopy." (2010).
Enderlein, Jörg, Erdal Toprak, and Paul R. Selvin. "Polarization effect on position accuracy of fluorophore localization." (2006).
Mortensen, Kim I., et al. "optimized localization analysis for single-molecule tracking and super-resolution microscopy." nature methods 7.5 (2010): 377.
J. R. Lakowicz, Principles of Fluorescence Spectroscopy, 3rd edn. (Springer Science, New York, 2006).
Chao, Jerry, E. Sally Ward, and Raimund J. Ober. "Fisher information matrix for branching processes with application to electron-multiplying charge-coupled devices.".
Lord, Samuel J., et al. "Photophysical Properties of Acene DCDHF Fluorophores: Long-Wavelength Single-Molecule Emitters Designed for Cellular Imaging." J. Phys. Chem. A 111 (2007): 8934-8941.
Bates, Mark, et al. "Multicolor Super-Resolution Fluorescence Imaging via Multi-Parameter Fluorophore Detection." ChemPhysChem 13, 99 (2012).
Testa, Ilaria, et al. "Nanoscale separation of molecular species based on their rotational mobility." Opt.Express 16, 21093 (2008).
Kao, H. P. and Verkman, A. S., "Tracking of Single Fluorescent Particles in Three Dimensions: Use of Cylindrical Optics to Encode Particle Position," Biophys. J. 67, pp. 1291-1300, (1994).
Piestun, R.; Schechner, Y. Y. and Shamir, J., "Propagation-Invariant Wave Fields with Finite Energy," J. Opt. Soc. Am. A, vol. 17, No. 2, (2000).
Thompson, R. E.; Larson, D. R. and Webb, W. W., "Precise Nanometer Localization Analysis for Individual Fluorescent Probes," Biophys J, vol. 82, pp. 2775-2783, (2002).
Ober, R. J.; Ram, S. and Ward, E. S., "Localization Accuracy in Single-Molecule Microscopy," Biophys J., vol. 86, pp. 1185-1200, (2004).
Prabhat, P.; Ram, S.; Ward, E. S. and Ober, R. J., "Simultaneous Imaging of Different Focal Planes in Fluourescence Microscopy for the Study of Cellular Dynamics in Three Dimensions," IEEE Transactions on Nanobioscience 3(4), pp. 237-242, (2004).
Betzig, E.; Patterson, G. H; Sougrat, R.; Lindwasser, O. W.; Olenych, S.; Bonifacino, J. S.; Davidson, M. W.; Lippincott-Schwartz, J. and Hess, H. F., "Imaging Intracellular Fluorescent Proteins at Nanometer Resolution," Science, vol. 313, pp. 1642-1645, (2006).
Greengard, A.; Schechner, Y. Y. and Piestun, R., "Depth from Diffracted Rotation," Opt. Lett., vol. 31, No. 2, (2006).
Hess, S. T.; Girirajan, T. P. K. and Mason, M. D., "Ultra-high Resolution Imaging by Fluorescence Photoactivation Localization Microscopy," Biophys J., vol. 91, pp. 4258-4272, (2006).
Ram, S.; Prabhat, P.; Chao, J.; Ward, E. S. and Ober, R. J., "High Accuracy 3D Quantum Dot Tracking with Multifocal Plane Microscopy for the Study of Past Intracellular Dynamics in Live Cells," Biophys. J. vol. 95, pp. 6025-6043, (2008).
Huang, B.; Wang, W.; Bates, M. and Zhuang, X., "Three-Dimensional Super-Resolution Imaging by Stochastic Optical Resonstruction Microscopy," Science, vol. 319, p. 810, (2008).
Pavani, S. R. P. and Piestun, R., "Three Dimensional Tracking of Fluorescent Microparticles Using a Photon-Limited Double-Helix Response System," Opt. Express, vol. 16, No. 26, (2008).
Sun, Y.; McKenna, J. D.; Murray, J. M.; Ostap, E M. and Goldman, Y. E., "Parallax: High Accuracy Three-Dimensional Single Molecule Tracking Using Split Images," Nano Lett. 9, pp. 2676-2682, (2009).
Shtengel, G.; Galbraith, J. A.; Galbraith, C. G.; Lippincott-Schwartz, J.; Gillette, J. M.; Manley, S.; Sougrat, R.; Vaterman, C. M.; Kanchanawong, P.; Davidson, M. W.; Fetter, R. D. and Hess, H. F., "Interferometric Fluorescent Super-Resolution Microscopy Resolves 3D Cellular Ultrastructure," Proc. Natl. Acad. Sci. USA 106, 3125 (2009).
Piestun, Univ. of Colorado and published in S. R. P. Pavani, M. A. Thompson, J. S. Biteen, S. J. Lord, N. Liu, R. J. Twieg, R. Piestun, and W. E. Moerner, "Three-Dimensional Single-Molecule Fluorescence Imaging Beyond the Diffraction Limit Using a Double-Helix Point Spread Function," Proc. Nat. Acad. Sci. (USA) 106, 2995-2999 (published online, Feb. 11, 2009).
Tang, J.; Akerboom, J.; Vaziri, A.; Looger, L. L and Shank, C. V., "Near-Isotropic 3D Optical Nanoscopy with Photon-Limited Chromophores," Proc. Natl. Acad. Sci. USA 107, pp. 10068-10073, (2010).
Badieirostami, M.; Lew, M. D.; Thompson, M. A. and Moerner, W. E., "Three-Dimensional Localization Precision of the Double-Helix Point Spread Function Versus Astigmatism and Biplane," Appl. Phys. Lett. 97, 161103, (2010).
Thompson, M. A.; Lew, M. D.; Badieirostami, M. and Moerner, W. E., "Localizing and Tracking Single Nanoscale Emitters in Three Dimensions with High Spatio-Temporal Resolution Using a Double-Helix Point Spread Function," Nano Lett. 10, pp. 211-218, (2010).
Einstein, Albert. "Über die von der molekularkinetischen Theorie der Wärme geforderte Bewegung von in ruhenden Flüssigkeiten suspendierten Teilchen." Annalen der physik 322.8 (1905): 549-560.
Von Smoluchowski, Marian. "Zur kinetischen theorie der brownschen molekularbewegung und der suspensionen." Annalen der physik 326.14 (1906): 756-780.
Richards, B., and E. Wolf. "Electromagnetic diffraction in optical systems. II. Structure of the image field in an aplanatic system." Proceedings of the Royal Society of London A: Mathematical, Physical and Engineering Sciences. vol. 253. No. 1274. The Royal Society, 1959.
Gelles, Jeff, Bruce J. Schnapp, and Michael P. Sheetz. "Tracking kinesin-driven movements with nanometre-scale precision." Nature 331.6155 (1988): 450-453.
Qian, Hong, Michael P. Sheetz, and Elliot L. Elson. "Single particle tracking. Analysis of diffusion and flow in two-dimensional systems." Biophysical journal 60.4 (1991): 910.
Kay, S. M. "Fundamentals of Statistical Signal Processing: Estimation Theory PTR Prentice Hall, Englewood Cliffs, NJ, 1993. 6 LL Scharf" Statistical Signal Process: Detection, Estimation, and Time Series Analysis.
Hell, S., et al. "Aberrations in confocal fluorescence microscopy induced by mismatches in refractive index." Journal of microscopy 169.3 (1993): 391-405. Abstract only.
Hell, Stefan W., and Jan Wichmann. "Breaking the diffraction resolution limit by stimulated emission: stimulated-emission-depletion fluorescence microscopy." Optics letters 19.11 (1994): 780-782.
Schmidt, Th, et al. "Imaging of single molecule diffusion." Proceedings of the National Academy of Sciences 93.7 (1996): 2926-2929.
Kino, Gordon S., and Timothy R. Code. Confocal scanning optical microscopy and related imaging systems. Academic Press, 1996. Book description provided.
Weigl, BH, and P. Yager. "Silicon-microfabricated diffusion-based optical chemical sensor." Sensors and actuators. B, Chemical 39.1-3 (1997): 452-457. Abstract only.
Saxton, Michael J., and Ken Jacobson. "Single-Particle Tracking: Applications to Membrane Dynamics." Annu. Rev. Biophys. Biomol. Struct 26 (1997): 373-99.
Bettega P. Calzolari SM Doglia B. Dulio L Tallone AM Villa, D. "Technical report: cell thickness measurements by confocal fluorescence microscopy on C3H10T1/2 and V79 cells." International journal of radiation biology 74.3 (1998): 397-403. Abstract only.
Peters, Inge M., et al. "Three dimensional single-particle tracking with nanometer resolution." Review of scientific instruments 69.7 (1998): 2762-2766. Abstract only.

(56) References Cited

OTHER PUBLICATIONS

Born, Max, Emil Wolf, and A. B. Bhatia. Principles of Optics: Electromagnetic Theory of Propagation, Interference and Diffraction of Light. Cambridge University Press, 1999. Book description provided.

Kamholz, Andrew Evan, et al. "Quantitative Analysis of Molecular Interaction in a Microfluidic Channel: The T-Sensor." Analytical Chemistry 71.23 (1999): 5340-5347.

Batchelor, George Keith. An introduction to fluid dynamics. Cambridge university press, 2000. Book description provided.

Ma, Yinfa, Michael R. Shortreed, and Edward S. Yeung. "High-throughput single-molecule spectroscopy in free solution." Analytical chemistry 72.19 (2000): 4640-4645. Abstract only.

Kamholz, Andrew Evan, Eric A. Schilling, and Paul Yager. "Optical Measurement of Transverse Molecular Diffusion in a Microchannel." Biophysical Journal 80 (2001): 1967-1972.

Fujiwara, Takahiro, et al. "Phospholipids undergo hop diffusion in compartmentalized cell membrane." The Journal of Cell Biology 157.6 (2002): 1071-1081.

Blab, Gerhard A., et al. "Simultaneous wide-field imaging and spectroscopy of localized fluorophores." Optics letters 29.7 (2004): 727-729. Abstract only.

Hanser, B. M., et al. "Phase-retrieved pupil functions in wide-field fluorescence microscopy." Journal of microscopy 216.1 (2004): 32-48.

Savin, Thierry, and Patrick S. Doyle. "Static and Dynamic Errors in Particle Tracking Microrheology." Biophysical Journal 88 (2005): 623-638.

Goodman, Joseph W. Introduction to Fourier optics. Roberts and Company Publishers, 2005. Book description provided.

Yager, Paul, et al. "Microfluidic diagnostic technologies for global public health." (2006).

Kim S. Y.; Gitai, Z.; Kinkhabwala, A.; Shapiro, L.; Moerner, W. E. Proc. Natl. Acad. Sci. U. S. A. 2006, 29, 10929-10934.

Werley, Christopher A., and W. E Moerner. "Single-molecule nanoprobes explore defects in spin-grown crystals." The Journal of Physical Chemistry B 110.38 (2006): 18939-18944 Abstract only.

Cohen, Adam E. Trapping and manipulating single molecules in solution. Diss. Stanford University, 2006.

Bock, H., et al. "Two-color far-field fluorescence nanoscopy based on photoswitchable emitters." Applied Physics B-Lasers and Optics 88.2 (2007): 161-165.

Holtzer, Laurent, Tobias Meckel, and Thomas Schmidt. "Nanometric three-dimensional tracking of individual quantum lots in cells." Applied Physics Letters 90.5 (2007): 053902.

Lee, Jungwoo, Meghan J. Cuddihy, and Nicholas A. Kalov. "Three-dimensional cell culture matrices: state of the art." Tissue Engineering Part B: Reviews 14.1 (2008): 61-86.

Abraham, A. V., Ram, S., Chao, J., Ward, E. S., & Ober, R. J. (2009). Quantitative study of single molecule location estimation techniques. Optics express, 17(26), 23352-23373.

Smith, C. S., Joseph, N., Rieger, B., & Lidke, K. A. (2010). Fast, single-molecule localization that achieves theoretically minimum uncertainty. Nature methods, 7(5), 373-375.

Adrian, Ronald J., and Jerry Westerweel. Particle image velocimetry. No. 30. Cambridge University Press, 2011. Book description provided.

Lew, Matthew D., et al. "Corkscrew point spread function for far-field three-dimensional nanoscale localization of pointlike objects." Optics letters 36.2 (2011): 202-204.

Baddeley, David, Mark B. Cannell, and Christian Soeller. "Three-dimensional sub-100 nm super-resolution imaging of biological samples using a phase ramp in the objective pupil." Nano Research 4.6 (2011): 589-598. Abstract only.

Lehmann, Martin, et al. "Quantitative multicolor super-resolution microscopy reveals tetherin HIV-1 interaction." PLoS Pathog 7.12 (2011): e1002456.

Dupont, Aurélie, and Don C. Lamb. "Nanoscale three-dimensional single particle tracking." Nanoscale 3.11 (2011): 4532-4541.

Cierpka, C., and C. J. Kahler. "Particle imaging techniques for volumetric three-component (3D3C) velocity measurements in microfluidics." Journal of visualization 15.1 (2012): 1-31.

Moerner, WE. "Microscopy beyond the diffraction limit using actively controlled single molecules." Journal of Microscopy 246.Pt 3 (2012): 213-220.

Michalet, Xavier, and Andrew J. Berglund. "Optimal diffusion coefficient estimation in single-particle tracking." Physical Review E 85.6 (2012): 061916.

Zervantonakisa, Ioannis K., et al. "Three-dimensional microfluidic model for tumor cell intravasation and endothelial barrier function." PNAS 109.34 (2012): 13515-13520.

Wu, Yicong, et al. "Spatially isotropic four-dimensional imaging with dual-view plane illumination microscopy." Nature biotechnology 31.11 (2013): 1032-1038.

Gahlmann, Andreas, et al. "Quantitative multicolor subdiffraction imaging of bacterial protein ultrastructures in 3D." Nano letters 13.3 (2013): 987.

Van den Dries, K., et al. "Dual-color superresolution microscopy reveals nanoscale organization of mechanosensory podosomes." Molecular biology of the cell 24.13 (2013): 2112-2123.

Cutler, Patrick J., et al. "Multi-color quantum dot tracking using a high-speed hyperspectral line-scanning microscope." PloS one 8.5 (2013): e64320.

Clausen, Mathias P., and B. Christofler Lagerholm. "Visualization of plasma membrane compartmentalization by high-speed quantum dot tracking." Nano letters 13.6 (2013): 2332-2337.

Hu, Ying S., et al. "Single-Molecule Super-Resolution Light-Sheet Microscopy." Chemphyschem 15.4 (2014): 577-586.

Small, Alex, and Shane Stahlheber. "Fluorophore localization algorithms for super-resolution microscopy." Nature methods 11.3 (2014): 267-279.

Welsher, Kevin, and Haw Yang. "Multi-resolution 3D visualization of the early stages of cellular uptake of peptide-coated nanoparticles." Nature nanotechnology 9.3 (2014): 198-203. Abstract only.

Hajj, Bassam, et al. "Whole-cell, multicolor superresolution imaging using volumetric multifocus microscopy." Proceedings of the National Academy of Sciences 111.49 (2014): 17480-17485.

McGorty, Ryan, et al. "Correction of depth-dependent aberrations in 3D single-molecule localization and super-resolution microscopy." Optics Letters 39.2 (2014): 275-278. Abstract only.

Backer, Adam S., and W. E. Moerner. "Extending single-molecule microscopy using optical Fourier processing." The Journal of Physical Chemistry B 118.28 (2014): 8313-8329.

Backer, Adam S., et al. "A bisected pupil for studying single-molecule orientational dynamics and its application to three-dimensional super-resolution microscopy." Applied physics letters 104.19 (2014): 193701. Abstract only.

\* cited by examiner

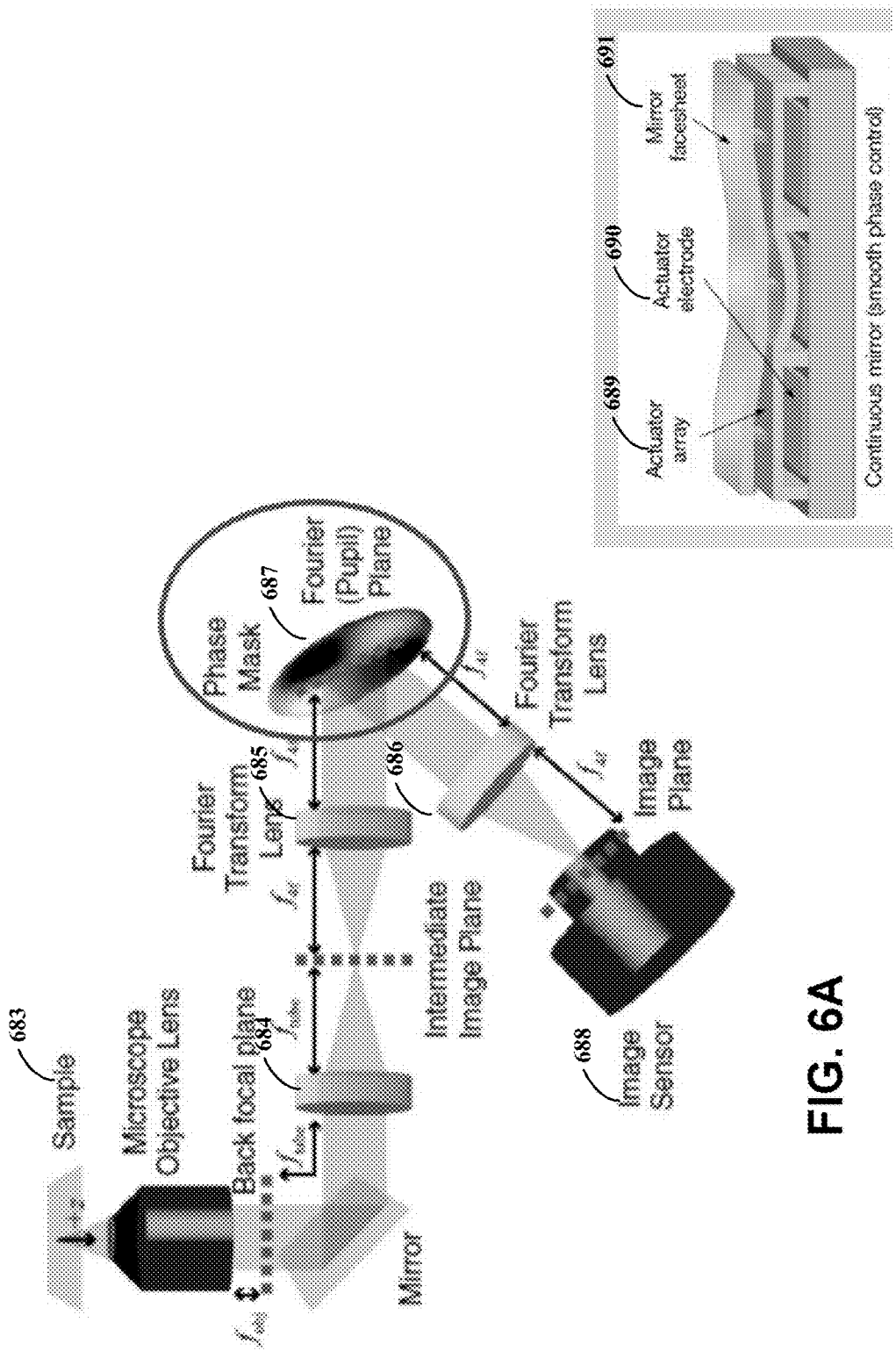

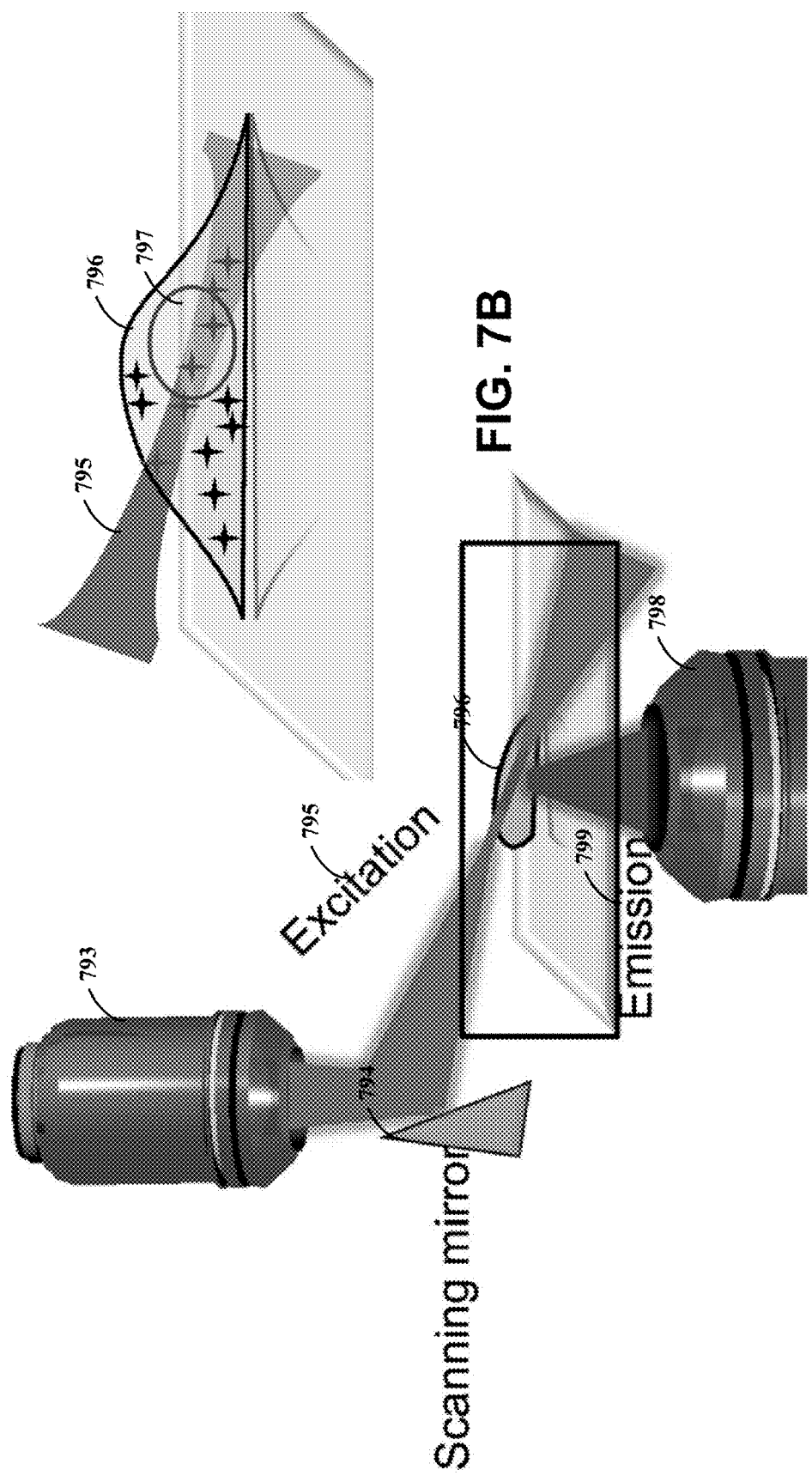

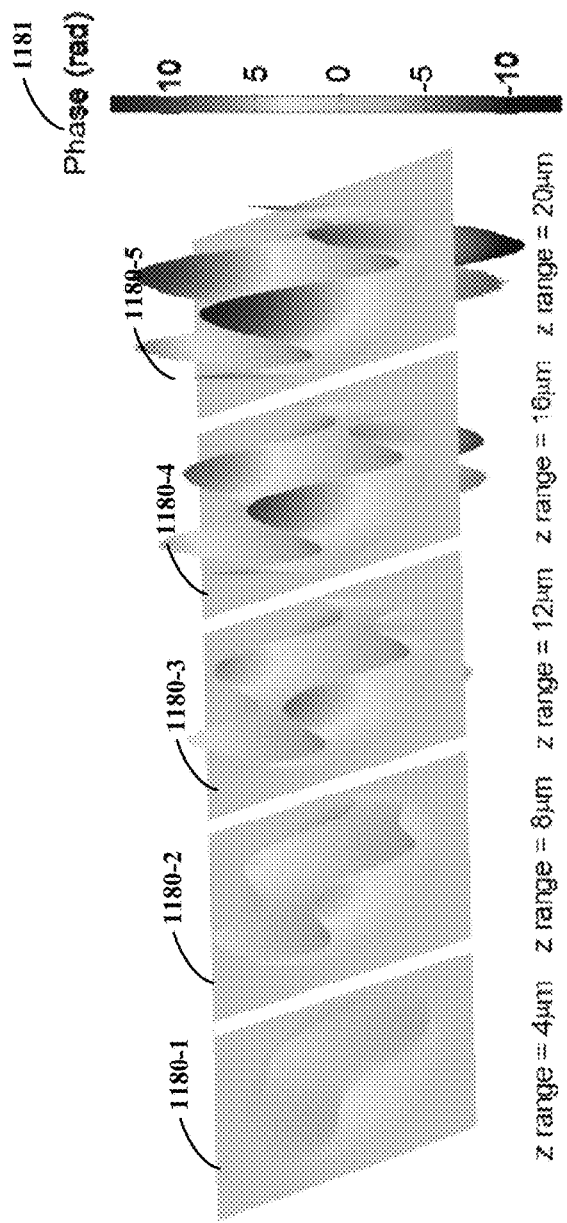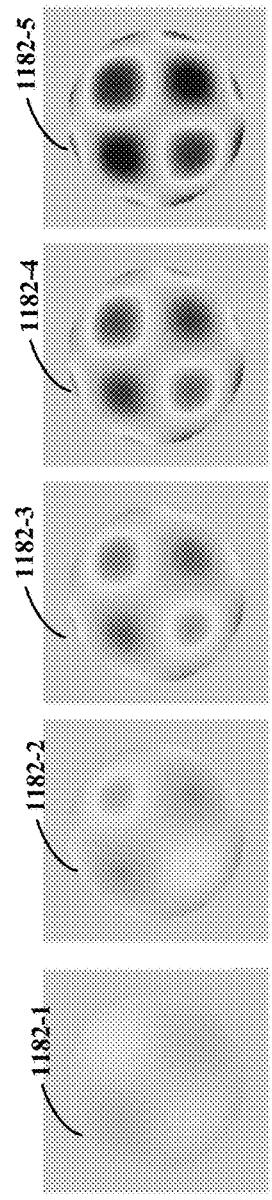
FIG. 11A
FIG. 11B

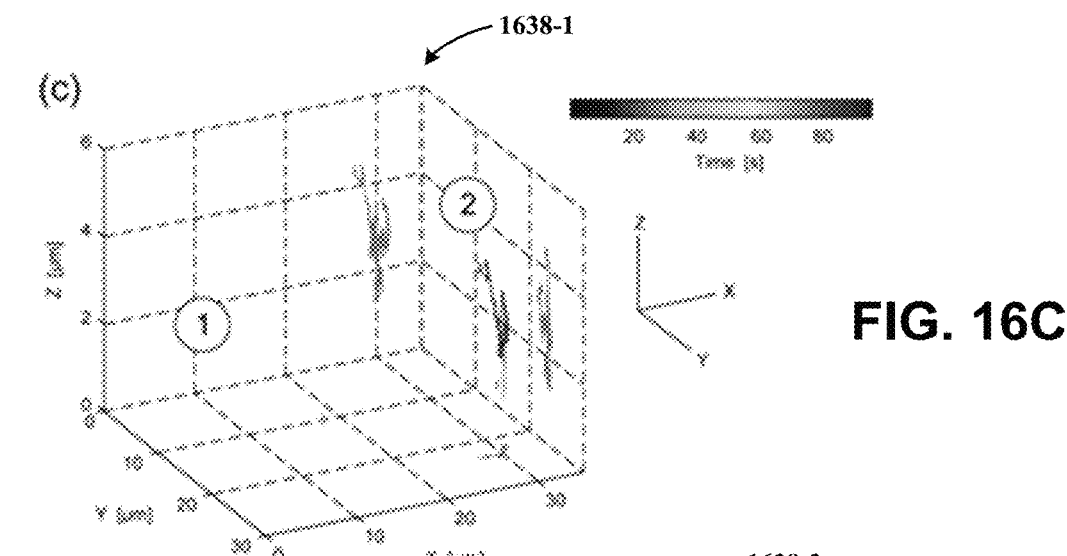
FIG. 16C
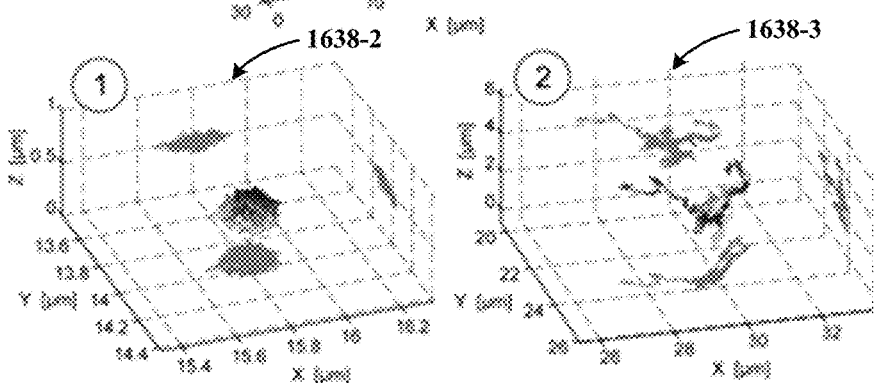
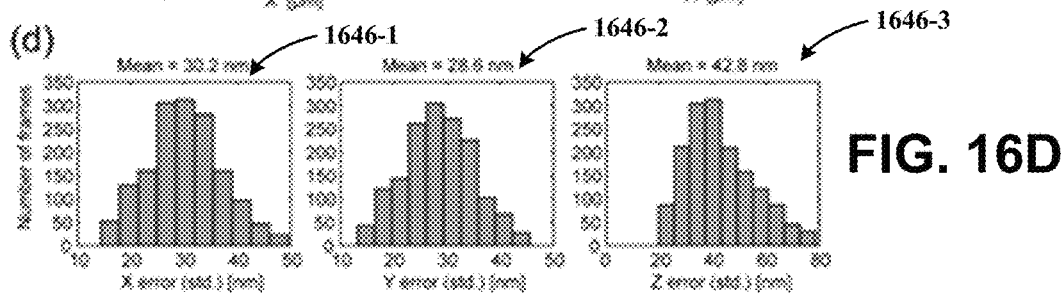
FIG. 16D

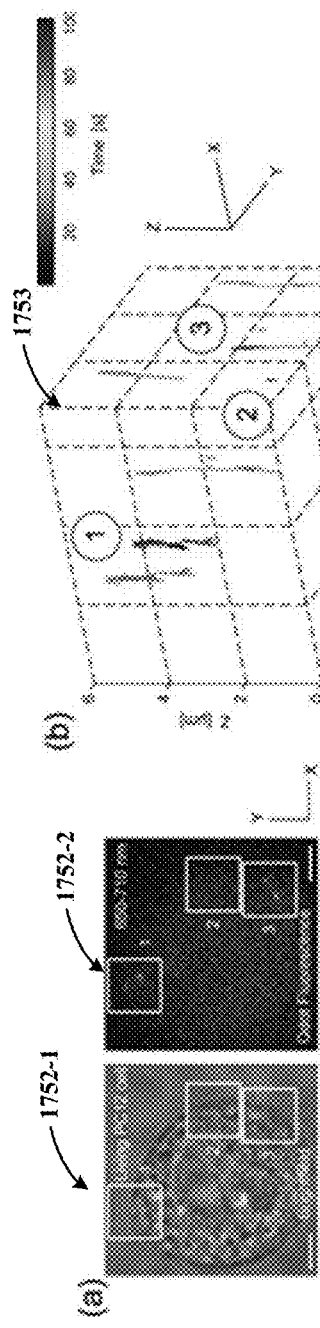
FIG. 17A
FIG. 17B
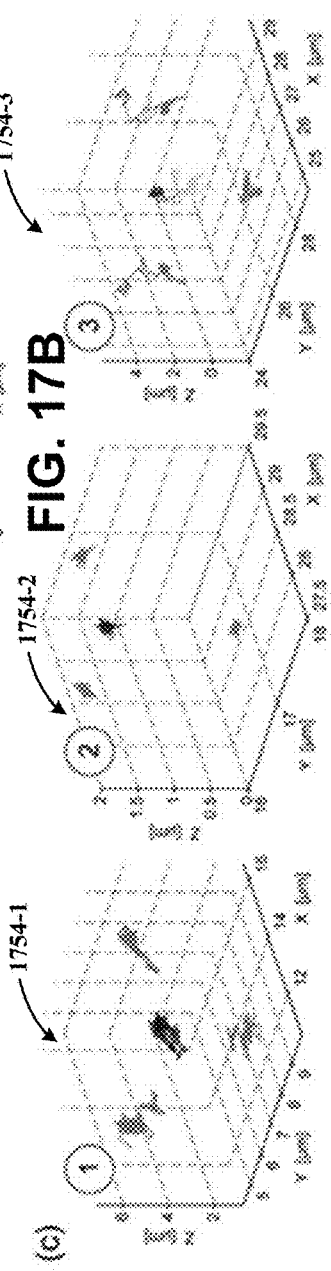
FIG. 17C
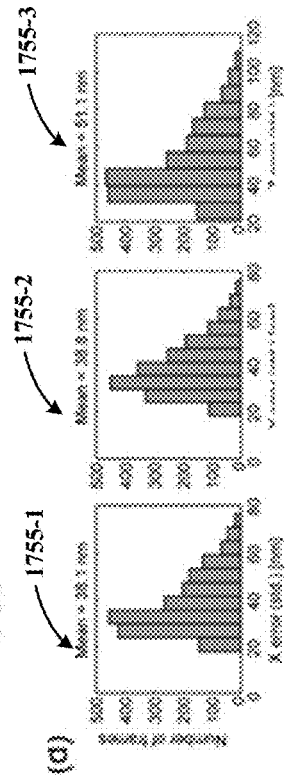
FIG. 17D

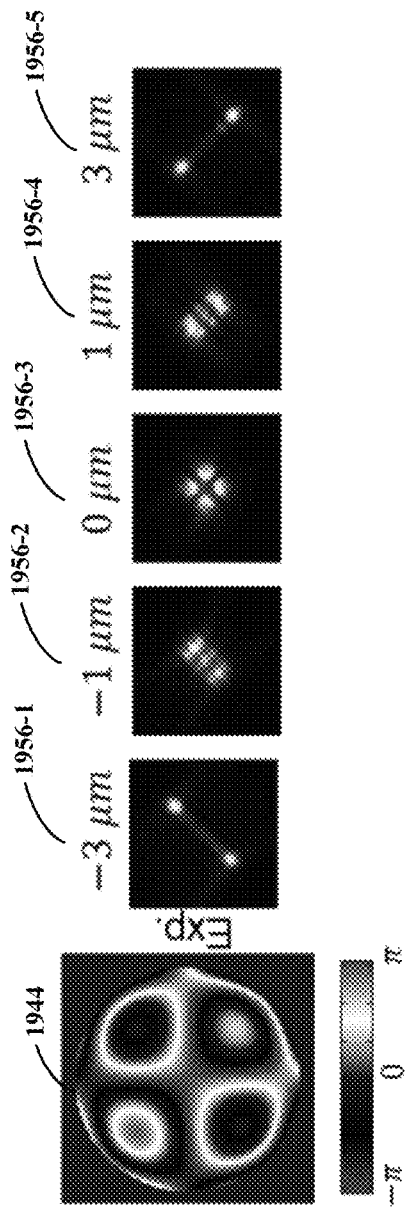
FIG. 19A
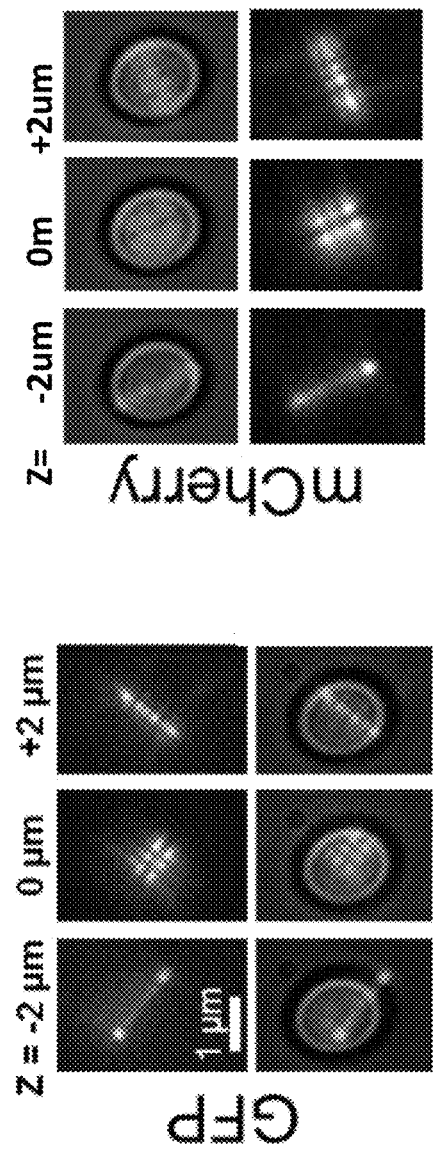
FIG. 19B
FIG. 19C

APPARATUSES AND METHODS FOR THREE-DIMENSIONAL IMAGING OF AN OBJECT

FEDERALLY-SPONSORED RESEARCH AND DEVELOPMENT

This invention was made with Government support under contract GM085437 awarded by the National Institutes of Health. The Government has certain rights in the invention.

BACKGROUND

Understanding of living cells is beneficial for a variety of research and development. In order to understand the complex machinery at work within living cells, the position of individual biomolecules is measured. For example, single-particle tracking (SPT), in which the trajectory of a moving individual molecular label, quantum dot, or nanoparticle is determined from a series of images, provides a valuable tool for a wide range of biological applications. Information inferred from the extracted particle trajectory sheds light on physical properties such as particle size, conformation, and the local environment, because observing the motion of single particles directly unmasks nanoscale behavior such as diffusion, directed motion, binding, or anisotropy. If only two-dimensional trajectories are recorded, information is missed.

These and other matters have presented challenges to three-dimensional imaging of particles, for a variety of applications.

SUMMARY

The present invention is directed to overcoming the above-mentioned challenges and others related to the types of devices discussed above and in other implementations. The present invention is exemplified in a number of implementations and applications, some of which are summarized below as examples.

Various embodiments in accordance with the present disclosure simultaneously measure all of these physical parameters, with minimal modification of a conventional microscope. For example, in some embodiments, a 4f optical processing circuitry is added to the camera. In addition, such apparatus embodiments include a relatively simple and cheap light-sheet microscope.

Various aspects of the present disclosure include an apparatus comprising a phase mask and circuitry. The phase mask is arranged with optics in an optical path to modify a shape of light, passed from an object. For example, the shape modification characterizes the light as having two lobes with a lateral distance that changes along a line, having a first orientation, as a function of an axial proximity of the object to the focal plane, and the line having a different orientation depending on whether the object is above or below a focal plane. In various specific aspects, the shape of light is referred to as a "tetrapod point spread function." The circuitry generates a three-dimensional image from the light by using the modified shape to provide depth-based characteristics of the object.

Other related aspects of the present disclosure include a method comprising providing optics and a phase mask in an optical path. Light is passed through the optical path to circuitry where the light is detectable. The circuitry encodes an axial position of an observed object based on the detected light. For example, the axial position of the observed object is encoded by modifying a point-spread-function (PSF) at the circuitry using one or more parameterized phase masks. The one or more parameterized phase masks are optimized, in various specific aspects, for a target depth-of-field range for an imaging scenario. For example, the PSF in various specific aspects is used for a target depth-of-field of up to 20 microns.

Various more specific aspects of the present disclosure include an apparatus comprising an optical path and circuitry. The optical path includes an imaging circuit, optics, and a phase mask. The imaging circuit is at an image plane in the optical path for detecting the light. The optics pass light from an object toward the image plane. And, the phase mask is arranged with the optics to modify a shape of light passing along the optical path, passed from the objects. The light passing along the optical path is modified to create a PSF. For example, the shape modification characterizes the light as having two lobes with a lateral distance that changes along a line, having a first orientation, as a function of an axial proximity of the object to the focal plane, and the line having a different orientation depending on whether the object is above or below a focal plane. The circuit generates a three-dimensional image from the light detected by using the modified shape to provide depth-based characteristics of the object.

DESCRIPTION OF THE FIGURES

Various example embodiments may be more completely understood in consideration of the following detailed description in connection with the accompanying drawings, in which:

FIGS. 6A-6B illustrate examples of a microscope apparatus, in accordance with various embodiments;

FIGS. 7A-7B illustrate examples of a light sheet microscope, in accordance with various embodiments;

FIGS. 11A-11B illustrate examples of a tetrapod point spread function in different z-ranges, in accordance with various embodiments;

FIGS. 16A-16D illustrate an example of three-dimensional tracking of objects using a tetrapod point spread function, in accordance with various embodiments;

FIGS. 17A-17D illustrate an example of three-dimensional tracking of objects using a tetrapod point spread function, in accordance with various embodiments;

FIGS. 19A-19C illustrate an example of two phase masks optimized for 6 um used for two different wavelengths in accordance with various embodiments.

Figure 1A:
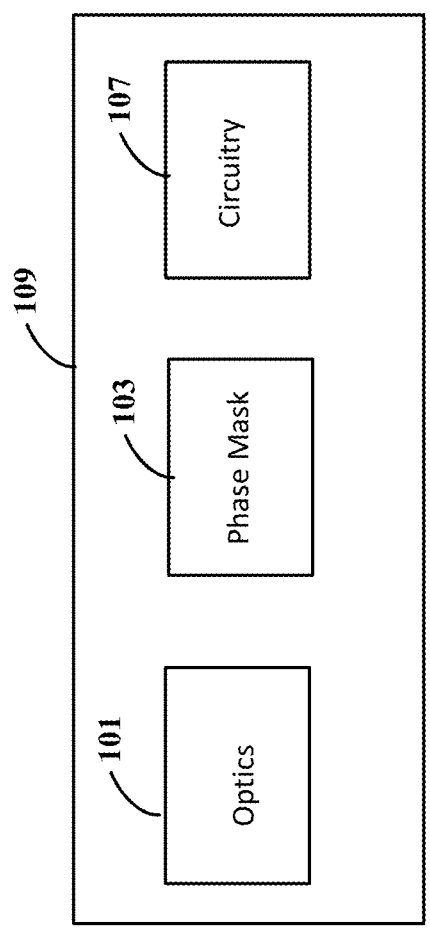
FIGS. 1A-1B illustrate example apparatuses in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the present disclosure are believed to be applicable to a variety of different types of apparatuses, systems and methods involving a phase mask that modifies a shape of light passed from an object and circuitry to generate a three-dimensional image by using the modified shape on a two-dimensional detector to provide depth-based characteristics of the object. In certain implementations, aspects of the present disclosure have been shown to be beneficial when used in the context of optical microscopy or with point spread functions that vary based on a depth range. While the present invention is not necessarily limited to such applications, various aspects of the invention may be appreciated through a discussion of various examples using this context.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

According to various example embodiments, aspects of the present disclosure are directed to three-dimensional (3D) localization of individual objects over a customizable depth range in optical microscopy. In some embodiments, a conventional microscope is modified and the shape of a point-spread-function (PSF) is used to encode the axial (depth) position of an observed object (e.g., a particle). The PSF is modified by Fourier plane processing using one of a set of parameterized phase masks, which is optimized for a depth-of-field range for the imaging scenario. An object, as used herein, includes an emitter, such as a particle, a molecule, a cell, a quantum dot, a nanoparticle, etc.

SPT techniques are typically based on frame-by-frame localization of the particle. Namely, a series of time-sequential images (frames) are captured using a microscope, and each frame is analyzed to yield the current position of the particle. In some applications, the extracted positions are in two dimensions (2D), comprising lateral, or x,y coordinates. The noisy and pixelated 2D detector image of the particle is analyzed, e.g., by centroid or Gaussian fitting, to yield the estimated x, y coordinates of the particle. However, as many samples of interest are inherently three-dimensional (3D), the full physical behavior of the tracked object is revealed by analyzing its 3D trajectory. The 3D trajectory of a moving particle can be extracted in several ways. For example, a particle can be followed by using a feedback control loop based on moving a 3D piezo stage according to the reading of several detectors (e.g., photodiodes). While providing a very precise temporal and spatial trajectory, this method is inherently limited to tracking a single particle.

Alternatively, scanning methods, such as confocal microscopy, are implemented, in which an illumination beam or the focal point of the microscope (or both) are scanned over time in three dimensions to yield a 3D image of the object. Scanning methods are limited in their temporal resolution, since at a given time only a small region is being imaged. In order to simultaneously track several particles in 3D, a scan-free widefield approach can be used.

In accordance with various embodiments, 3D microscopic localization of point-like light objects is generated using wide-field microscopy. When a point-like (e.g., sub-wavelength) source of light is positioned at the focal plane of a microscope, the image that is detected on the imaging circuitry, such as a camera and/or a detector, is known as the PSF of the microscope. A conventional microscope's PSF (e.g., essentially a round spot) is used for imaging a two-dimensional (2D) 'slice' of a specimen, and for 2D (x,y) transverse localization of an object within that slice. That is, by fitting the shape of the spot with a 2D function such as a centroid, Gaussian, or Airy function, in some instances, the position of the object is detected with precision (a process termed super-localization). However, objects that are a small distance above or below the microscope's focal plane can appear blurry, and furthermore, their depth (or axial distance from the focal plane) is difficult to determine from their measured image. In accordance with various embodiments, 3D (x, y, and z) position information is obtained, even when an object is above or below the focal plane. Using a phase mask, an additional module is installed on a conventional microscope to solve the blur and depth issues. Instead of a point of light forming a single 'spot' on the camera, light passing through the phase mask forms a shape on the camera that looks different as a function of the object and distance from the focal plane (or amount of defocus).

Certain embodiments in accordance with the present disclosure include use of an optimization technique including PSFs with impressive depth ranges. Surprisingly, for a given optical system (e.g., with limitations defined by an objective lens), depth ranges are realized, for an application, far beyond previously-known range limits of 2-3 um. As a specific example, using a phase mask optimized for a particular depth range, super-localization over a customizable depth range is performed up to 20 um using a 1.4 numerical aperture (NA) objective lens. However, embodiments are not so limited and the depth range in various embodiments is greater than 20 um. The depth range, for example, is a function of the NA objective lens and the light emitted by the object. In various embodiments, the PSF is used for 3D super-localization and tracking, as well as for 3D super-resolution imaging in biological samples, since this is an applicable depth range used for observing the 3D extent of a mammalian cell.

Certain PSFs, in accordance with the present disclosure may be referred to as tetrapod PSFs, due to the shape they trace out in 3D space, as a function of the emitter position (the position of the object). In a number of embodiments, the modified shape characterizes the light as having two lobes with a lateral distance that changes along a line, having a first orientation, as a function an axial proximity of the object to the focal plane, and the line having a different orientation depending on whether the object is above or below a focal plane. For example, the different orientation of the line as compared to the first orientation, in various embodiments, includes a lateral turn of the line from the first orientation to the different orientation, such as a 90 degree or 60 degree lateral turn. This shape has lines from the center of a tetrahedron to the vertices, or like a methane molecule. The PSF is composed of two lobes, where their lateral distance from one another and orientation are indicative of the z position of the object. Above the focal plane, the two lobes are oriented along a first line, and below the focal plane the two lobes are oriented along a second line that is differently orientated than the first line (e.g., perpendicular to the first line). For example, the modified shape is created, in various embodiments, by decreasing the lateral distance (e.g., moving together) of the two lobes along the first line when the object is above the focal plane and is closer to the focal plane (e.g., moving closer), turning the two lobes laterally, such as 90 degrees, and increasing the lateral distance (e.g., moving apart) of the two lobes another along the second line when the object is below the focal plane and is further away from the focal plane (e.g., moving away).

Emitter (e.g., object) localization can be optimally performed using maximum likelihood estimation, based on a numerical or experimentally obtained imaging model. However, other localization methods can be used. While other methods for 3D imaging can be used, such methods use scanning (e.g. confocal), in which temporal resolution is compromised, or parallelizing the imaging system (multi-focal imaging), which complicates the implementation. Embodiments in accordance with the present disclosure do not use a scan or parallelization technique, and include observation of multiple single emitters in a field at high precision throughout depth ranges, such as discussed above.

In accordance with specific embodiments, aspects of the present disclosure involve 3D super-localization microscopy techniques. Such techniques can include tracking single biomolecules with fluorescent labels inside a biological sample, and 3D analysis using other light emitting objects such as quantum-dots or the scattered light from gold beads or nano-rods. Additionally, various embodiments include use of a microfluidic device to characterize flow in 3D. Embodiments in accordance with the present disclosure mitigate background noise in the measured image that is caused by fluorescent emitters that are outside the focal plane being optically excited, and therefore emit light (which contributes to background noise in the measured image). One method to mitigate background noise includes light-sheet microscopy (LSM). In LSM, only a narrow slice of the thick sample is illuminated at a given time, therefore only objects (e.g., emitters) within that slice are active (illuminating).

In various embodiments of the present disclosure, an LSM (e.g., a relatively simple LSM) is used in combination with a tetrapod PSF. For example, with a tetrapod PSF, depth information is encoded in the PSF shapes and the sample is illuminated in a descending angle relative to the field of view. The z-slice illuminated by the LSM is not parallel to the focal plane of the object, but rather, it is tilted by some angle. Due to the large depth range, PSFs in accordance with the present disclosure can accommodate an angle that is steep (tens of degrees). Therefore, imaging is performed all the way down to the substrate, and the light sheet is scanned. The tetrapod PSF, as used herein, is not a rotation of a shape of the passing light (e.g., relative to a center line) as a function of the axial position of the object (as with a spiral and/or helix PSF). Such embodiments can be advantageously implemented relative to previous LSM schemes. Such previous LSM schemes can be difficult to implement because imaging that is close to the bottom of the sample involves overlapping the illumination beam with the underlying glass substrate, which distorts the beam and prevents the formation of an undistorted light-sheet illumination profile. Therefore LSM techniques (Bessel beam methods, for example) are cumbersome, costly, or use stringent manufacturing constraints. In one dual-objective design based on 45 degree excitation and collection objectives, the imaging is constrained to using low numerical aperture (NA) objective lenses, limiting the photon collection efficiency and ultimately reducing precision.

According to various example embodiments, aspects of the present disclosure are directed to an apparatus or method involving encoding an axial (e.g., depth) position of an observed particle by modifying a point-spread-function (PSF) using one or more parameterized phase masks. In various embodiments, each such parameterized phase masks are optimized for a target depth-of-field range for an imaging scenario. In specific embodiments, the optics pass light from an object toward the image plane and the phase mask. The phase mask is used to modify a shape of light, passed from the object. The shape modification includes a shape of light as a function of an axial proximity of the object, such as a tetrapod PSF. In various embodiments, the shape of light is characterized by having two lobes with a lateral distance that changes along a line, having a first orientation, as a function of an axial proximity of the object to a focal plane, and with the line having a different orientation depending on whether the object is above or below the focal plane.

The circuitry infers depth information about objects that are imaged. For example, the circuitry can be configured to infer depth of portions of the object based on the modified shape and a degree of blur, a tetrapod point-spread function (PSF), a 3D shape of the object on the image plane and a location of a portion of the object from which the light is emitted, and/or a Zernike polynomial (and any combination thereof). In some embodiments, the circuitry generates the 3D image based on a Zernike polynomial of at least a $3^{rd}$ order. In various embodiments, the generated 3D image is indicative of respective depths of portions of the object that are greater than 3 microns from one another.

The phase mask, in some embodiments, is a deformable mirror used to tune the depth characteristic by deforming. For example, the phase mask tunes a depth characteristic to obtain light from the object at different respective depths. In some embodiments, the apparatus and/or method, as described above, includes a tuning circuit used to tune the depth characteristic.

In a number of particular embodiments, an apparatus and/or method in accordance with the present disclosure is used to track objects. For example, an apparatus and/or method is used to localize an object, track locations and/or movement of an object, track locations and/or movement of multiple objects simultaneously, and/or characterize flow in 3D in a microfluidic device (and any combination thereof).

In embodiments involving single-molecule based super-resolution microscopy, combining a tetrapod PSF with a tilted light-sheet microscope allows for depth measurements of individual fluorescing molecules over a depth range that reaches or exceeds 20 um. This data is used to construct a 3D image of a large biological structure (e.g., whole mammalian cell) with resolution surpassing the diffraction limit by an order of magnitude. In the context of single-particle tracking microscopy, the phase mask allows for the 3D position of individual sub-diffraction limited objects to be monitored. An apparatus in accordance with various embodiments is used to track particles such as fluorescent molecules, quantum dots or the scattered light from gold beads or nanorods.

In a number of embodiments, phase mask design parameters may be adjusted to deliver optimal performance for a given depth range. Thereby, the phase mask in accordance with the present disclosure is not as limited in depth range as other depth estimation techniques. A module incorporating a phase mask, in accordance with various embodiments, is installed on an existing microscope (e.g., commercial microscope) in a short period of time, such as less than thirty minutes. A phase mask can allow for a high numerical aperture (NA) implementation for light-sheet-microscopy.

In accordance with various embodiments of the present disclosure, 3D position information is extracted from a single widefield 2D image, by modifying the microscope's point spread function (PSF), namely, the image which is detected when observing a point source. Examples of PSF alterations which are used for 3D tracking and imaging under biological conditions include astigmatism, the double-helix PSF, the corkscrew PSF, the bisected-pupil PSF, and an Airy-beam-based PSF, with applicable z-ranges of around 1-2 µm for astigmatism and the bisected pupil PSF, and around 3 µm for the double-helix, corkscrew, and Airy PSFs.

Embodiments in accordance with the present disclosure include generating (information-optimal) PSFs for 3D imaging based on numerically maximizing the information content of the PSF. Surprisingly, the resulting PSF exhibits superior 3D localization precision over other PSFs. Despite gradual improvements in PSF designs, other PSFs can be limited in terms of their applicable z-range. Currently, the z-range of other PSF designs is limited to around 3 µm, posing a major limitation for applications requiring 'deep' imaging. For example, the thickness of a mammalian cell can be larger than 6 µm and in the case of cells grown on cell feeder layers or in 3D cell cultures, which are becoming increasingly popular in the biological community, samples are much thicker than 3 µm.

In various embodiments of the present disclosure, by utilizing the information maximization framework, a group or family of (tetrapod-type) PSFs are used for 3D localization over a depth range far larger than the applicable depth ranges of other designs, such as optimized for ranges of 2-20 um. By setting the optimization parameters to correspond to the desired depth range, specific PSFs yield 3D localization optimized over the range. For example, in various embodiments, a tetrapod PSF can be optimized for a 20 µm z-range, and as may be applicable to flow-profiling in a microfluidic channel. In other embodiments, such a PSF is optimized for a 6 µm z-range under biological conditions (e.g., tracking single quantum-dot labeled lipid molecules diffusing in live mammalian cell membranes).

Figure 1B:
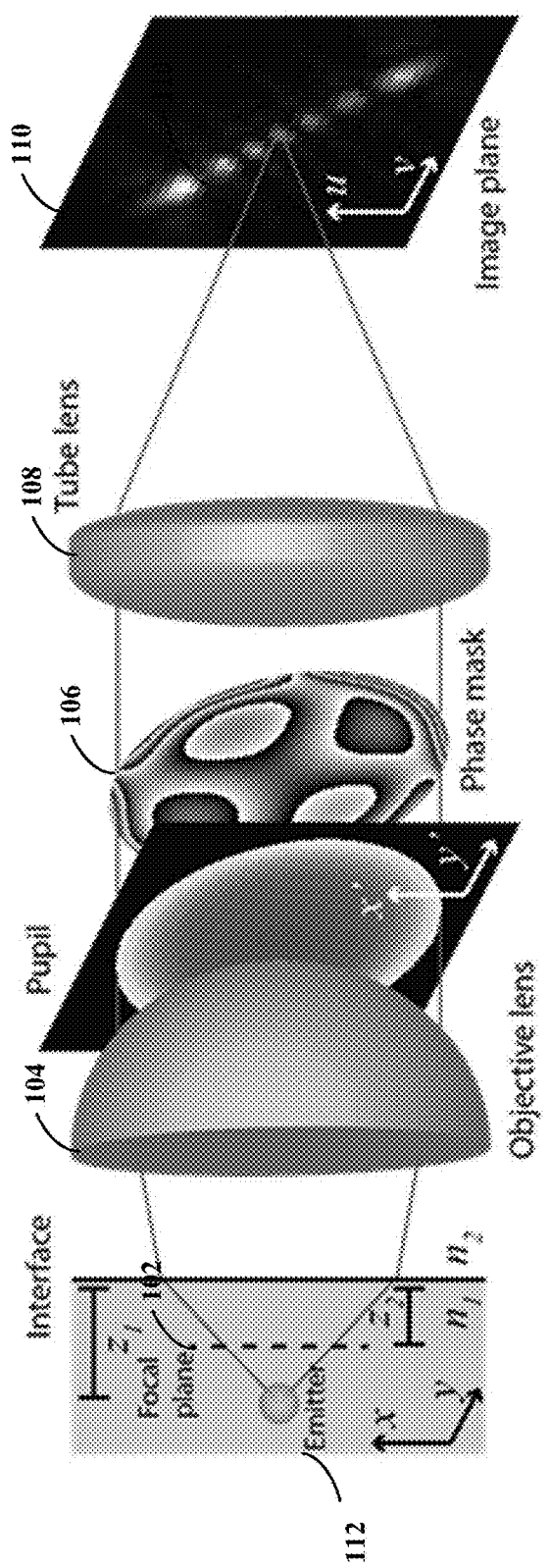
Figure 2:
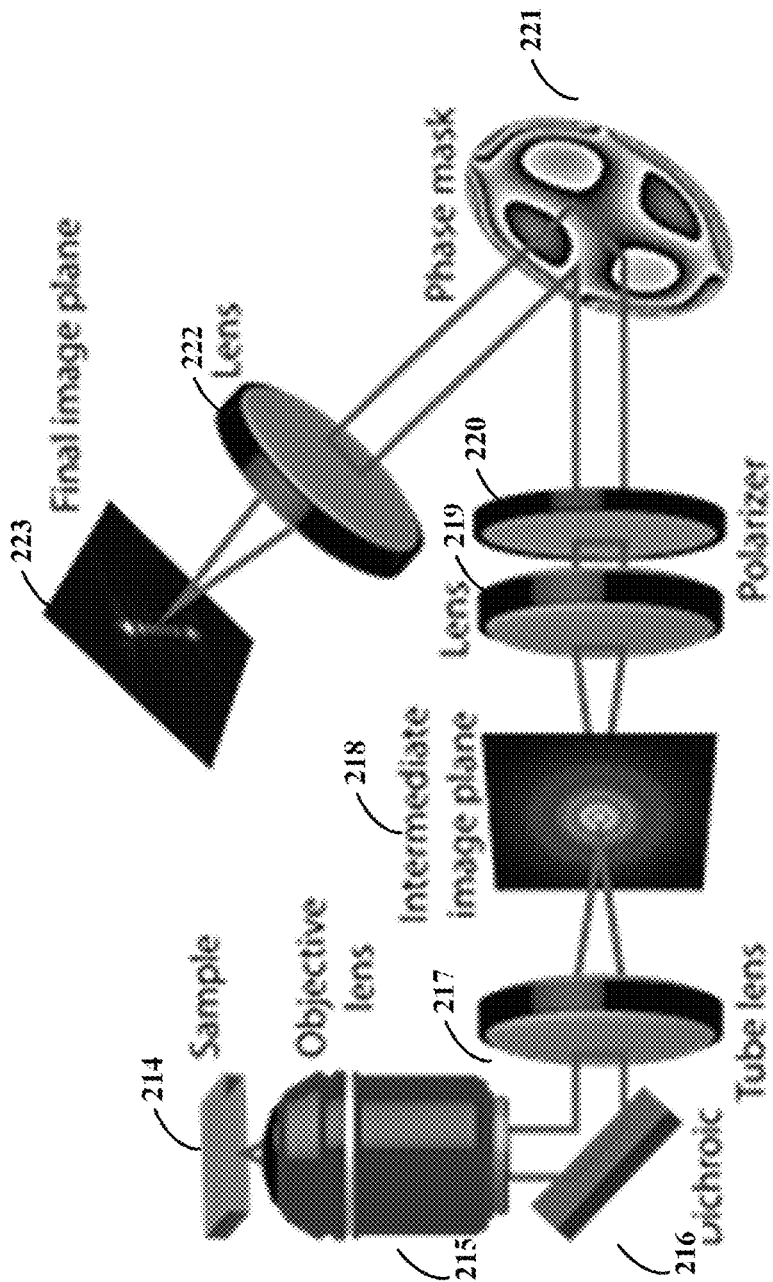
FIG. 2 illustrates an example of an apparatus in accordance with various embodiments.

Turning now to the figures, FIG. 1A illustrates an example apparatus 109 in accordance with various embodiments of the present disclosure. In such embodiments, the apparatus 109 is used to design a family of point spread functions (PSFs). The family of PSFs allow for precise localization of nanoscale emitters in 3D over customizable axial (z) ranges of up to 20 µm, with a high numerical aperture objective lens. For example, axial (e.g., depth) position of an observed particle and/or other object is inferred by modifying a PSF using one or more parameterized phase masks. In some embodiments, the apparatus is used to perform flow profiling in a microfluidic channel, and illustrates scan-free tracking of single quantum-dot-labeled phospholipid molecules on the surface of living, thick mammalian cells The apparatus 109 includes a phase mask 103 and circuitry 107. The phase mask 103 is arranged with optics 101 in an optical path. For example, the optical path is from the optics 101 to the phase mask 103 to the circuitry 107. The optics pass light from an object toward the image plane. For example, the optics can include the various lenses, as illustrated by FIGS. 1B and 2. The phase mask 103 modifies a shape of the light based on a distance of respective portions of the object from the image plane. For example, the modified shape characterizes the light as having two lobes with a lateral distance that changes along a line, having a first orientation, as a function of an axial proximity of the object to the focal plane, and the line having a different orientation depending on whether the object is above or below a focal plane. In some specific embodiments, the lateral distance decreases as a function of the axial proximity of the object to the focal plane. For example, as the object gets closer to the focal plane, the lateral distance decreases. Similarly, as the object gets farther away from the focal plane, the lateral distance increases. Further, in various related embodiments, the two lobes are oriented along a first line with a lateral distance that changes as the function of the axial proximity of the object to the focal plane and when the object is above the focal plane. As the object approaches and/or is in the focal plane, the two lobes turn orientations, such as 90 degrees. And, the two lobes are oriented along a second line with another lateral distance that changes as the function of the axial proximity of the object to the focal plane and when the object is below the focal plane. The first line being parallel, or at another angle based on the turn of the lobes, to the second line.

The modification of light by the phase mask 103, in various embodiments, creates a modified PSF. For example, the PSF includes a tetrapod PSF, as further illustrated by FIG. 1C. That is, the modified shape includes a tetrahedral shape as a function of the axial position, as further described herein. The object, as used herein, corresponds to and/or includes an emitter, such as a particle, a molecule, a cell, a quantum dot, a nanoparticle, etc. In various embodiments, the object is located in a sample and/or is labeled using a color. Various figures of the present disclosure illustrate a phase mask pattern, such as an input voltage pattern, as the phase mask. As may be appreciated, the actual phase mask is patterned with the illustrated phase mask pattern.

The phase mask 103, in various embodiments, is placed in the Fourier plane to modify light in the optical path. For example, the phase mask 103 modifies a shape of the light by redirecting and modifying the light passing along the optical path to create a tetrapod PSF at the image plane (e.g., the circuitry 107). The phase mask has a pattern that includes two peaks and two valleys, such as a two-dimensional saddle point function with two peaks and two valleys. The phase mask 103 creates the tetrapod PSF, in various embodiments, by moving two lobes toward one another along a first line and when the object is above the focal plane, turning the two lobes 90 degrees laterally, and moving the two lobes apart from one another along a second line that is perpendicular to the first line and when the object is below the focal plane. Accordingly, a feature of the tetrapod PSF is two lobes that vary in separation as a function of the object depth. The axis along which the lobes separate rotates 90 degrees or various other orientations, depending on whether the object is above or below the focal plane.

The circuitry 107 generates a 3D image from the light detected via the circuitry 107. The circuitry 107 uses the modified shape (e.g., the tetrapod PSF) to provide depth-based characteristics of the object. The depth-based characteristics include the 3D position information (x, y, and z) and/or axial dimension (z). For example, the circuitry 107 infers depth of portions of the object based upon the PSF. In various embodiments, the circuitry 107 can include an imaging circuit at the image plane (e.g., the final image plane) for detecting the light.

In various embodiments, the circuitry 107 generates the 3D image that is indicative of respect depths of portions of the object that are at least 3 um from one another. For example, the circuitry 107 infers depth of portions of the object based upon a 3D shape of the object on the image plane and a location of a portion of the object from the emitted light. In various embodiments, the circuitry 107 infers the depth of portions of the object based on Zernike polynomial, such as a Zernike polynomial of at least a $3^{rd}$ order, as discussed further herein.

The circuitry 107, in accordance with a number of embodiments, encodes the axial position of the object based on the tetrapod PSF created by the phase mask 103. Encoding the axial position allows for the circuitry 107 to localize an object, such as a particle, in 3D based on the tetrapod PSF. Further, locations of one or more objects in 3D are tracked by the circuitry 107 over a period of time and simultaneously based on the encoded axial position. For example, the circuity 107 characterizes flow of the one or more particles, such as in a microfluidic device.

In various embodiments, the phase mask 103 tunes the depth characteristics to obtain light from the object at different respective depths. For example, the apparatus 109 includes a tuning circuit that manipulates the phase mask 103 to tune the depth characteristics. In such embodiments, the phase mask 103 includes a deformable mirror configured to tune the depth characteristics.

The specific phase mask design (corresponding to a certain PSF from the tetrapod family) is dependent on the apparatus parameters, mainly on the depth range. For different apparatus 109 parameters (magnification, numerical apertures, etc.), the phase mask 103 is optimized using an optimization routine, as discussed further herein. For example, in some embodiments, the phase mask 103 yields slightly different phase mask patterns. Related embodiments in accordance with the present disclosure utilize PSF engineering to provide optimized, high-precision localization capability, for a large depth range. For example, such a phase mask design can yield a depth range of 2-20 um for a 1.4 NA objective lens (with other parameter-set limitations, such as magnification, background/signal levels, and noise issues). In some embodiments, the tetrapod PSF is tailored and optimized to a specific depth range, which is dependent on and/or defined as a function of the information encoded in the PSF, as well as the NA objective lens and the light emitted by the object. Surprisingly, it has been discovered, with such a tetrapod-type PSF, the information for a given amount of light emitted by an object and for a given NA objective lens has a significantly greater precision than other PSFs.

In some embodiments, a number of functions (e.g., equations and algorithms) for specifying the exact design of a phase mask 103 (e.g., parameterized phase mask) are used based on the system parameters of a given imaging application. In addition, in various embodiments, the localization of an object given a measured image of the PSF is performed using maximum-likelihood-estimation. In a number of embodiments, a module (e.g., computer-readable code) is executed by the circuitry 107 of the apparatus 109 to perform both of these actions, including the imaging model (as discussed further herein). At the same time, in various embodiments, a set of phase masks are calculated to produce tetrapod PSFs for various fixed z-ranges, and the expected shapes of the PSFs are provided as a library (e.g., stored using the circuitry 107). In accordance with various embodiments, no calculation is required by the user except to perform fitting of the acquired images using interpolation of images from the library.

FIG. 1B illustrates an example apparatus in accordance with various embodiments. As illustrated, the apparatus includes a modified microscope. The apparatus includes a phase mask 106 that is installed in an optical path (e.g., detection pathway) of the microscope. Phase masks, in accordance with various embodiments, allow for precise 3D localization of multiple objects (e.g., emitters) over a customizable depth range. The customizable depth range, in some embodiments, is up to 20 um for a 1.4 NA objective lens. The phase mask 106, in various embodiments, is used to simultaneously track the location of multiple objects at different depths, allowing scan-free high speed imaging. The phase mask 106, in some embodiments, includes a mirror, such as a deformable mirror.

As illustrated, the apparatus includes an optical path that includes optics 104, 108 that pass light from an object 112 from an object plane toward an image plane 110. A phase mask 106 is arranged with the optics 104, 108 to modify the shape of light passed from the object 112. For example, in some embodiments, the phase mask 106 is positioned between the objective lens 104 and a tube lens 108. As illustrated, the object 112 in various embodiments is outside (e.g., above or below) a focal plane 102 of the apparatus. That is, the z-position of the object 112 is not zero.

Such circuitry can be located at the image plane 110 for generating a 3D image from light detected at the image plane 110 using the modified shape to provide depth-based characteristics of the object 112. The circuitry, in various embodiments, includes imaging circuitry. The imaging circuitry is circuitry commonly used with digital signal image processing (such image circuitry includes, e.g., a charge-coupled device (CCD), image sensors based on field-effect technology such as CMOS image sensors, and the like).

Figure 1C:
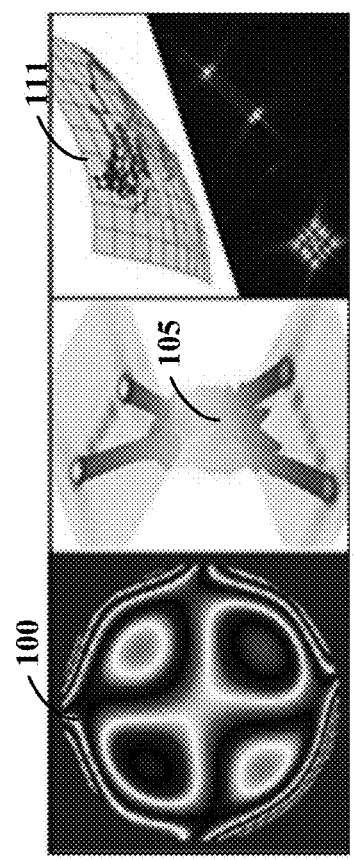
FIG. 1C illustrates an example of a modified shape of light in accordance with various embodiments.

FIG. 1C illustrates example modifications of light by a phase mask, in accordance with various embodiments. For example, the phase mask 100 creates a tetrapod PSF 105 in various embodiments. In various embodiments, the tetrapod PSF 105 includes a characterization of light having two lobes with a lateral distance that changes along a line, having a first orientation, as a function of an axial proximity of the object to the focal plane, and the line having a different orientation depending on whether the object is above or below a focal plane. As illustrated, the phase mask 100 modifies light to create a (tetrahedral) shape of light as a function of an axial position of the object that resembles a methane molecule. In a number of embodiments, the shape has two lines from the center of the shape to two vertices oriented along a first line when the object is above the focal plane and two lines from the center to two vertices oriented along a second line when the object is below the focal plane. The second line is has a different orientation than the first line, such as the second line being at an angle (e.g., perpendicular) to the first line. A 3D rendering of the tetrapod PSF 105 illustrates the intensity as a function of the object's axial position away from the focal plane (at z=0) which is coded by the shading (darker as further above or below the focal plane). The graph 111 illustrates localizations of the object, as tracked using circuitry.

FIG. 2 illustrates an example apparatus in accordance with various embodiments. As illustrated, the apparatus includes a modified microscope. The apparatus, in various embodiments, is a standard (inverted) microscope, augmented by a 4f optical processing system. The PSF of the microscope is modified from that of a standard microscope by controlling the phase of the electromagnetic field in the Fourier plane of the 4f system using a phase mask 221. In various embodiments, the PSF of the standard microscope is modified by placing a phase mask 221 in the Fourier plane of the microscope. The phase mask 221, in various embodiments, includes a (dielectric) phase mask or a liquid crystal-based spatial light modulator (SLM).

As illustrated by FIG. 2, the apparatus includes an optical path. The optical path is from the object 214 to the image plane 223. The object 214, in various embodiments, is in a sample such as a biological sample on a glass slip. The optical path includes optics 215, 216, 217,219, 220, 222 configured to pass light from the object 214 toward the image plane 223. The optics include one or more focusing lenses (e.g., objective lens 215) and a light source to illuminate an object 214. Various other focusing lenses 216, 217,219, 222 focus the light, after interacting with the object 214, to the image plane 223 for detection by circuitry. The optional polarizer 220 provides for polarization selection in some embodiments. A phase mask 221 is located between an intermediate image plane 218 and the final image plane 223, in various embodiments. For example, the phase mask 221 is placed in the back focal plane of optics 219, 220 and input focal plane of optics 222. Once implemented, an apparatus, consistent with that shown in FIG. 2, can be used to accomplish 3D imaging of an object and encode the axial position.

The phase mask 221, in some embodiments, is placed in between the two optics 219/222. The mask, in accordance with the instant disclosure, also serves the imaging functions of optics 219/222. The phase mask, and as contemplated in other embodiments, is a hologram, a computer-generated hologram, a diffractive optical element, a volume optical element, or the like. The mask may have one or both of amplitude and phase components. The mask may be static or dynamic, based upon the scene being imaged, system requirements, or user requirements. The mask may be implemented with a spatial light modulator which manipulates the phase and/or the amplitude of the light. Examples of such masks include those constructed from liquid crystals or from micro-electro-mechanical systems. Further, a physical mask can also be fabricated, for example, by electron beam lithography, proportional reactive ion etching in SiO2, hot embossing in PMMA, gray level lithography, multistep photolithography, or direct laser writing.

The light source in a number of embodiments includes a coherent light source. The coherent light source may include, for example, an Argon ion laser operating at 488 or 514 nanometer (nm), or a diode laser emitting at 532 nm or 641 nm. Other lasers operating at various wavelengths may also be used as sources of coherent light. The light source may produce monochromatic or polychromatic light. The optics expand or reduce the laser beam so that it illuminates a region of interest of the object 214. These optics may also be supplemented by polarizers, waveplates, or diffusers in order to manipulate the polarization or coherency of the light illuminating the object. Other light sources that produce incoherent light, such as an arc lamp, may also be used. The focus elements may comprise, for example, coated achromatic lenses with 150 mm focal length and an aperture of 50 mm. However, these focus elements may be of different focal lengths in order to accomplish beam expansion or reduction. Various other lenses or optical components may also be included in order to focus light from the object onto the detector.

The circuitry, in various embodiments, encodes an axial position of the observed object 214 by modifying a PSF at the circuitry using one or more parameterized phase masks. For example, the parameterized phase mask 221 is optimized for a target depth-of-field range for an imaging scenario. The apparatus, for example, provides a target depth-of-field of greater than 2 micrometer (um) and up to at least 20 um. Encoding an axial position, in various embodiments, includes localizing a particle in 3D based on the modified PSF (e.g., a tetrapod PSF), tracking locations of multiple particles simultaneously based on the encoded axial position, and/or characterizing flow in three-dimensions in a microfluidic device In various embodiments, the 3D image is generated using an image model. An example image model (e.g., an image formulation model) is built using a function, such as:

$$I(u,v;x,y,z) \propto |\mathcal{F}\{E(x',y';x,y,z)P(x',y')\}|^2, \quad (1)$$

where I(u, v) is the image, or the intensity in the image plane 223 (e.g., camera plane), of a point source (e.g., the object) located at position (x, y, z) in sample space, relative to the focal plane and the optical axis (z). The field in the pupil plane, caused by the objective lens 215 (e.g., point source), is denoted by $E(x', y')$, and $\mathcal{F}$ represents the 2D spatial Fourier transform with appropriate coordinate scaling. The complex function $P(x',y')$ is the pattern imposed in the pupil plane by a phase mask 221 (e.g., mask or an SLM).

Designing a PSF that allows for 3D localization over a large z-range, under high-background conditions (due to out-of-focus fluorescence or sample autofluorescence) can be challenging due to a number of demands. On one hand, the optics concentrate the light into a relatively small region throughout the applicable z-range in order to overcome background noise. On the other hand, the PSF contains Fisher information, i.e., features which change as a function of z, such that its shape encodes the z position of the emitter with high "recognizability" or "z-distinctness", which then translates into high statistical localization precision when localizing under noisy conditions.

The precision of a given PSF is quantified by the Cramer Rao Lower Bound (CRLB). The CRLB is a mathematical quantity indicative of the sensitivity of a measurement to its underlying parameters. More specifically, the CRLB corresponds to the lowest possible variance in estimating these parameters with an unbiased estimator. In accordance with various embodiments of the present disclosure, the measurement is a noisy, pixelated manifestation of the PSF (the 2D image), and the underlying parameters are the 3D coordinates of the object (e.g., emitter), as well as the brightness from the object expressed as total signal photons, and a background level of photons arising from imperfections.

In various embodiments, given the apparatus parameters (such as magnification, numerical aperture, background and signal levels, and a (Poisson) noise model), a numerical imaging model is built based on Eq. 1. Such a model is used to find the Fourier phase pattern P(x', y') which yields the PSF with the lowest theoretical localization variance (equivalently—the lowest CRLB). The CRLB is related to the Fisher information matrix—more specifically, it is the inverse of the Fisher information. Therefore, the objective function being minimized is the mean trace of the Fisher information matrix (corresponding to mean x,y,z CRLB) over a finite set of N unique z positions in a defined z-range. For example, the equation 2 includes a summary of the minimization problem:

$$\underset{\text{w.r.t.: } P(x', y')}{\text{Minimize}} \frac{1}{N} \sum_{j=1}^{N} \text{Trace}\{F_{z_j}^{-1}\} \qquad (2)$$

Wherein in Eq. (2) above, $F_{z_j}$ is the 3-by-3 Fisher information matrix associated with the x-y-z localization precision of the PSF at the j'th z position. This optimization is performed over a subset of functions, e.g. Zernike polynomial. In various embodiments, the depth of portions of the object 214 is inferred based on a Zernike polynomial. For example, circuitry generates the 3D image based on a Zernike polynomial of at least a third order, as further described herein.

Performing optimization with different specified z-ranges, in some embodiments, yields different phase masks (and corresponding PSFs). However, the resulting PSFs share common characteristics. The common characteristics include, for any tested z-range (from 2-20 μm), two distinct lobes, with growing transverse distance between them as the emitter departs from the apparatus' focal plane. The orientation of the two lobes of the PSF, in some embodiments, is rotated by 90° above and below the focal plane. PSFs, in accordance with the present disclosure, are therefore referred to as tetrapod PSFs, due to the 3D tetrahedral shape they trace out as the object is moved in the z direction (e.g., the axial direction).

Figures 3A, 3B, 3C, 3D:
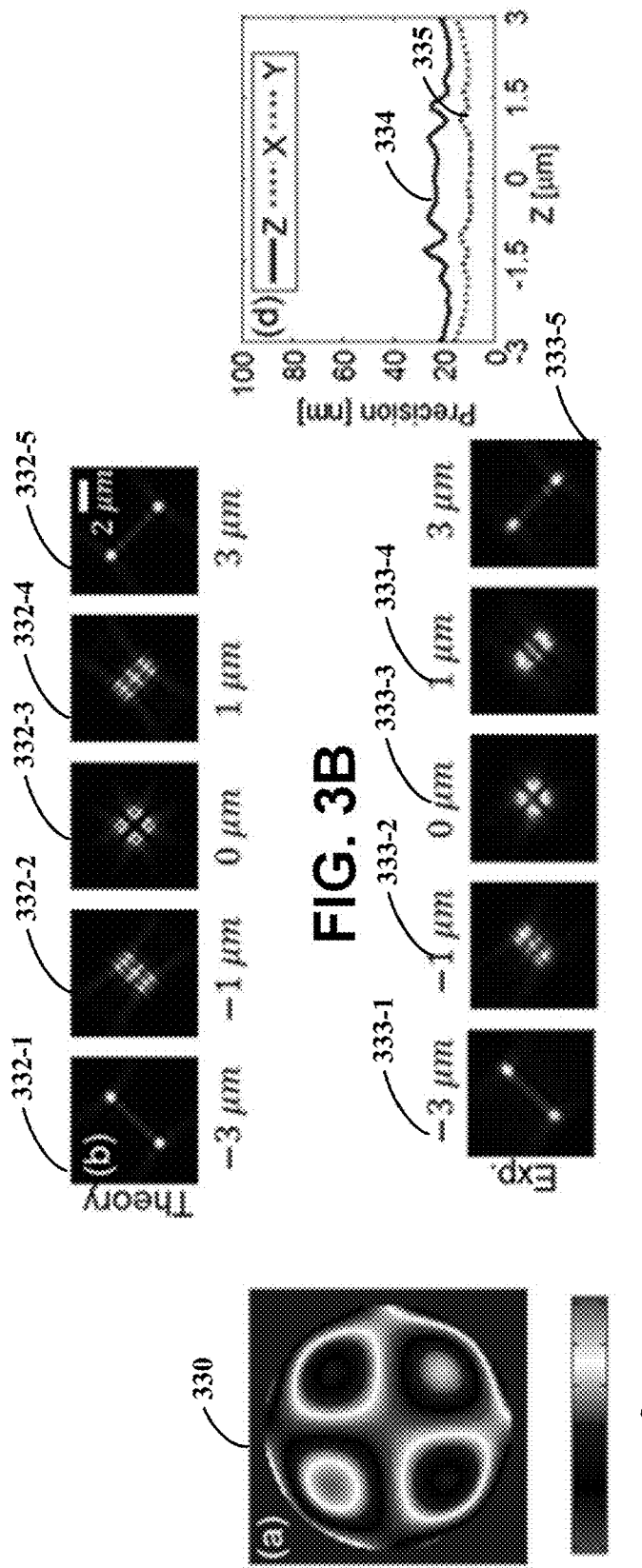
FIGS. 3A-3D illustrate an example of a phase mask optimized for a depth of field range of 6 um in accordance with various embodiments.

FIGS. 3A-3D illustrate an example of a phase mask and corresponding tetrapod PSF optimized for a depth of field range of 6 um in accordance with various embodiments. This phase mask 330 illustrated by FIG. 3A is optimized to work in a (high) background scenario corresponding to live cell imaging conditions, such as, 3500 signal photons, and a mean background of 50 photons per pixels. The PSF measurements, in various embodiments, are obtained by imaging a 200 nanometers (nm) fluorescent bead attached to an apparatus (e.g., microscope) cover slip, and scanning the apparatus objective such that the focal plane is above or below the bead. The resulting PSF 330 (e.g., a phase pattern), in various embodiments, is used to concentrate the light into lobes and vary the PSF shape (e.g., shape of light) as a function of z positions. FIG. 3B illustrates modified PSF's 332-1, 332-2, 332-3, 332-4, 332-5 for various z positions as numerically calculated. FIG. 3C illustrates measured bead images for each of the z positions 333-1, 333-2, 333-3, 333-4, 333-5 using the phase mask 330. FIG. 3D illustrates calculated precision (e.g., standard deviation for the parameter measurement) for the z-position 334 and the x/y position 335.

Figures 4A, 4B, 4C, 4D:
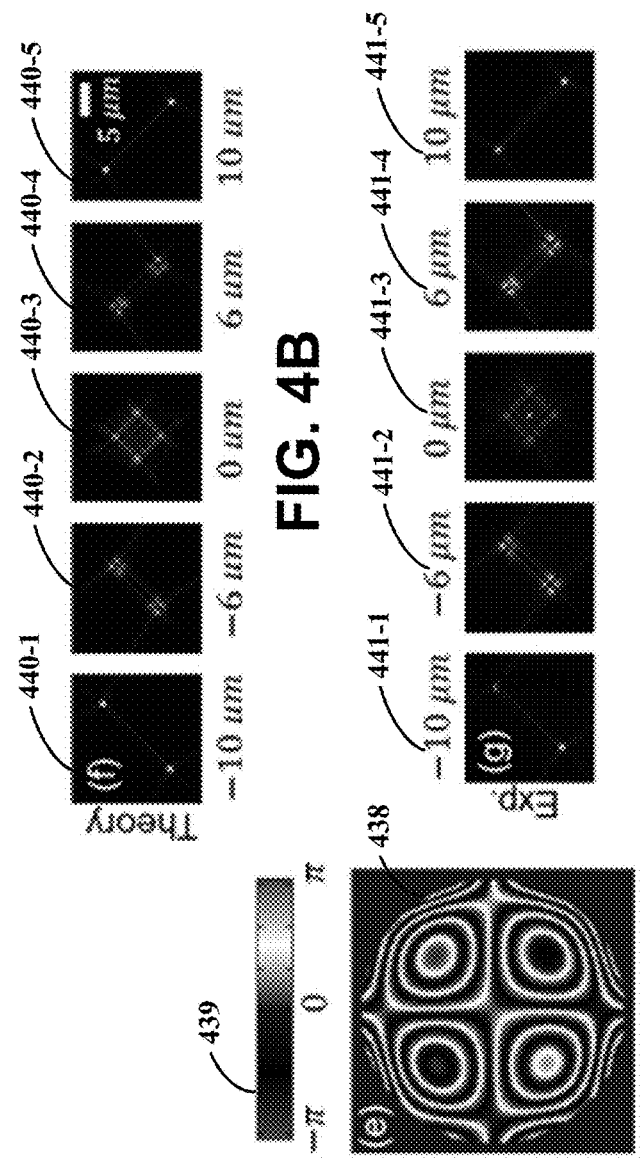
FIGS. 4A-4D illustrate an example of a phase mask optimized for a depth of field range of 20 um in accordance with various embodiments.

FIGS. 4A-4D illustrate an example of a phase mask and corresponding tetrapod PSF for a depth of field range of 20 um in accordance with various embodiments. This phase mask 439 (e.g., a phase pattern), illustrated by FIG. 4A is optimized to work in a (high) background scenario corresponding to live cell imaging conditions, such as, 3500 signal photons, and a mean background of 50 photons per pixel. The PSF measurements, in various embodiments, are obtained by imaging a 200 nanometers (nm) fluorescent bead attached to an apparatus (e.g., microscope) cover slip, and scanning the apparatus objective such that the focal plane is above or below the bead. The resulting phase mask 439, in various embodiments, is used to concentrate the light into lobes and vary the PSF shape (e.g., shape of light) as a function of z. Concentrating the light and varying the PSF shape is achieved due to optimizing the objective function based on the CRLB. FIG. 4B illustrates modified PSF's 440-1, 440-2, 440-3, 440-4, 440-5 for various z positions as numerically calculated. FIG. 4C illustrates measured bead images for each of the z positions 441-1, 441-2, 441-3, 441-4, 441-5 using the phase mask 439. FIG. 4D illustrates the calculated precision (e.g., standard deviation of the parameter measurement) for the z-position 442 and the x/y position 443.

In some embodiments, the calculated precision (e.g., standard deviation, defined as $\sqrt{\text{CRLB}}$) for a signal of 3500 photons over a mean background of 50 photons per pixel is plotted, as illustrated by FIGS. 3D and 4D. According to the CRLB calculations, under particular signal-to-noise conditions, the phase masks 330/439 illustrated by FIGS. 3A and 4A exhibit a mean precision of 12 nm, 12 nm, 21 nm (29 nm, 29 nm, 53 nm) in estimating x, y and z, respectively, using the 6 μm PSF (20 μm PSF). For more information on the tetrapod PSF optimization at different z ranges, see Appendix C of the underlying provisional application, which is fully incorporated herein by reference.

That is, FIGS. 3A and 4A illustrate tetrapod masks, optimized for z-ranges of 6 μm and 20 μm. For example, FIGS. 3A and 4A illustrate 6 μm and 20 μm Tetrapod phase mask 330/439 patterns. FIGS. 3B and 4B illustrate numerical PSF calculation for various z position, and FIGS. 3C and 4C illustrate measured bead images, each image normalized by maximum intensity. FIGS. 3D and 4D illustrate numerically calculated precision, defined as $\sqrt{\text{CRLB}}$ for x, y and z determination, using 3500 signal photons on a background of 50 mean photons per pixel.

Figure 5:
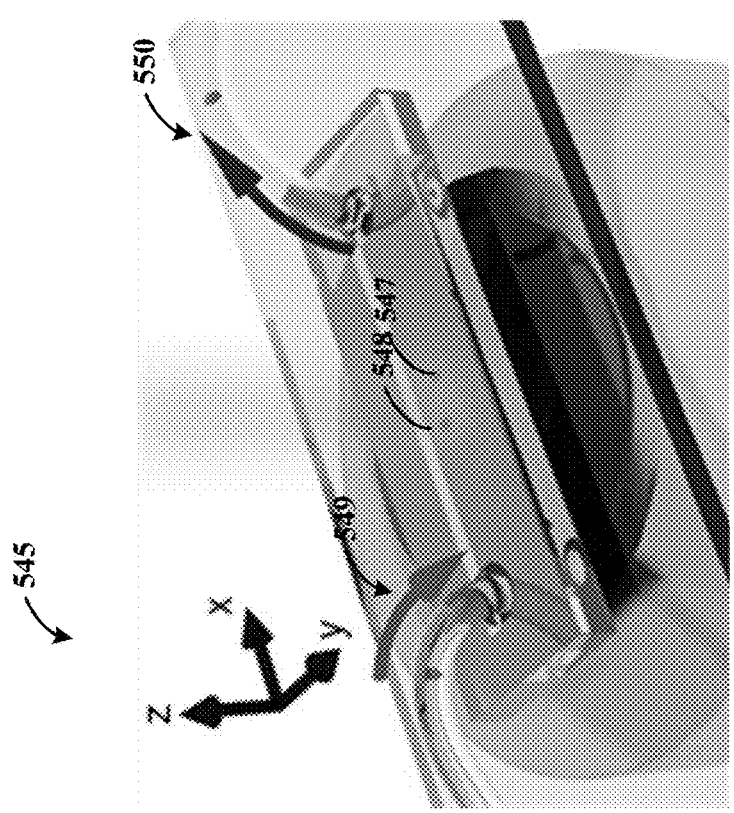
FIG. 5 illustrates an example microfluidic apparatus, in accordance with various embodiments.

FIG. 5 illustrates an example microfluidic apparatus 545, in accordance with various embodiments. In various embodiments, an optical apparatus including a phase mask (e.g., a 20 μm Tetrapod mask 439 as illustrated by FIG. 4A) is used for flow profiling in a microfluidic channel. The microfluidic device 545 is useful for obtaining various measurements of interest, ranging from molecular diffusion coefficients or pH, and spanning 3D vascular modeling to inexpensive clinical diagnostic applications. The use of PSF engineering provides a scan-free (and precise) method for 3D flow profiling in such apparatuses.

In some embodiments, a laminar flow regime is analyzed. For general and specific information on a laminar flow region, reference is made to Batchelor, G. K. *An introduction to fluid dynamics*; Cambridge university press: 2000, which is hereby fully incorporated by reference. Water with a low concentration (around 0.5 pM) of fluorescent beads is flowing 549/550 through a glass microfluidic channel with a semi-circular cross-section (50±8 µm (width)×20±3 µm (height) near the center of the channel). A 641 nm laser illuminates the sample, the widefield fluorescence signal from the flowing beads is recorded, and a video is taken (5 millisecond (ms) exposures at 20 Hertz). The beads are localized as they flow, and the profile of the flow is obtained by analyzing their trajectories, a technique called particle-image-velocimetry (PIV). 3D localization of each bead in each frame is achieved using maximum-likelihood estimation based on fitting each image to a numerical model of the PSF and taking into account objective defocus and refractive index mismatch between sample and mounting medium. For general and specific information about PIV, reference is made to Adrian, R. J.; Westerweel, J. *Particle image velocimetry*; Cambridge University Press: 2011; Vol. 30 and Cierpka, C.; Kähler, C. *Journal of visualization* 2012, 1, 1-31, both of which are hereby fully incorporated by reference.

The microfluidic device 545 includes a microfluidic channel setup with two beads 548, 547. Water with fluorescent beads (200 nm diameter, 625 nm absorption/645 nm emission) is flowing through a micro-channel, placed on top of a microscope objective of an inverted microscope. As the beads 547, 548 flow, they are excited by a laser (641 nm), and their fluorescence signal is captured.

FIGS. 6A-6B illustrate examples of a microscope apparatus, in accordance with various embodiments. As illustrated by FIG. 6A the apparatus includes various lenses 684, 685, 686 in an optical path between the object 683 and the image plane. A phase mask 687 is located in the Fourier Plane between two Fourier Transform lenses 685, 686.

FIG. 6B illustrates an example deformable mirror. In various embodiments, the phase mask is a deformable mirror used to tune the depth characteristic by deforming. For example, the phase mask tunes a depth characteristic to obtain light from the object at different respective depths. In some embodiments, the apparatus includes a tuning circuit used to tune the depth characteristic.

A deformable mirror includes a mirror face-sheet 691 that is attached to an array of posts and an actuator array 689. For example, each post is centered an actuator array 689. The actuator array 689 includes a flexible cantilever that is suspended over an actuator electrode 690. Further, the entire mirror face-sheet 691 and actuator array 690 is fabricated on a silicon wafer, in various embodiments.

FIGS. 7A-7B illustrate examples of a light sheet microscope, in accordance with various embodiments. In various embodiments, the apparatus includes a light sheet microscope (LSM) as illustrated by FIG. 7A. The LSM, at any given time, illuminates a slice of a sample and/or an object, around 2 um thick, by a sheet of light. A LSM, in various embodiments, utilizes a tilted illumination 795 relative to the focal plane. For example, optics 793 illuminate 795 a slice of the sample 796 and/or the object at a time. Thereby, the optics pass a sheet of light through the sample 796 and/or the object via tilted illumination of the sample 796 and/or the object relative to the image plane. A scanning mirror 794, in various embodiments, is utilized to adjust the axial height of the light sheet. Light emitted 799 from the slice of the sample is detected using circuitry 798, such as imaging circuitry. FIG. 7B illustrates an example of illuminating 795 a slice 797 of a sample 796 at a time using an LSM, such that only portions of the sample 796 are illuminated at a given time.

In various embodiments of the present disclosure, an LSM (e.g., a relatively simple LSM) is used because the depth information is already encoded in the PSF shapes and the sample 797 is illuminated in a descending angle relative to the field of view. For example, the z-slice illuminated by the LSM is not parallel to the focal plane of the objective, but rather, it is tilted by some angle. Due to the large depth range, PSFs in accordance with the present disclosure provide an angle that is steep (tens of degrees). Therefore, imaging is performed all the way down to the substrate, and the light sheet is scanned in the axial direction to sequentially illuminate the sample.

More Specific/Experimental Embodiments

Figure 8B:
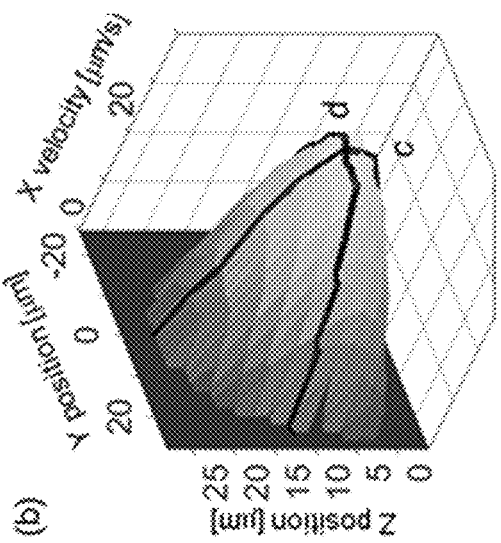
FIGS. 8A-8D illustrate examples of depth based characteristics determined using an apparatus, in accordance with various embodiments.
Figure 8D:
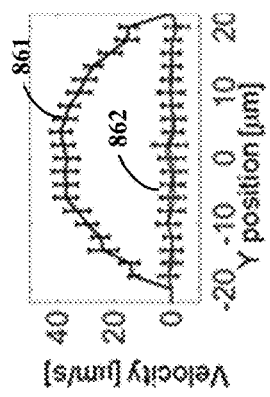
Figure 8A:
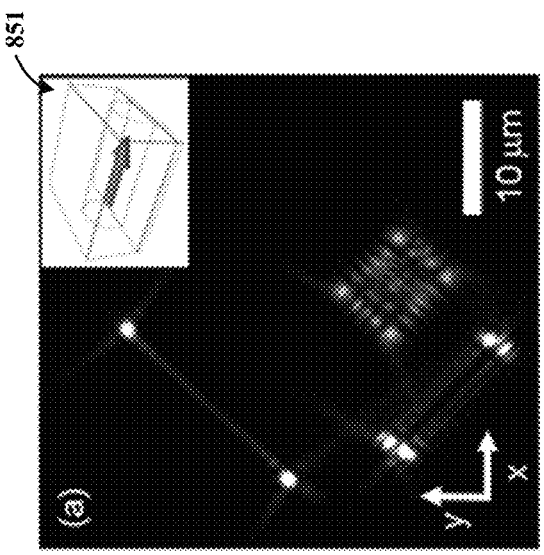

FIGS. 8A-8D illustrate examples of depth based characteristics determined using an apparatus, such as a microfluidic device and a modified microscope, in accordance with various embodiments. FIG. 8A shows an example of a raw-data frame, with three beads at different x, y, and z positions simultaneously seen. By accumulating many frames (around 16000), the mean flow velocity as a function of x, y and z is calculated. The example raw frame, of FIG. 8A, shows three emitters at different x, y, z positions, flowing in the x direction.

Figure 8C:
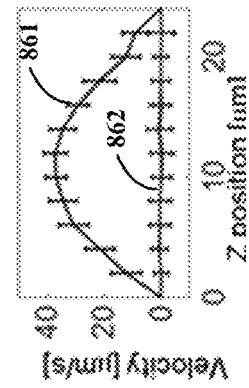

FIG. 8B shows the y-z profile of the flow (which is in the x direction), whereas FIG. 8C and FIG. 8D show 1D cross-sections near the center of the channel. The x velocity profiles 861 are (reasonably) parabolic, while the mean y and z 862 are around 0. This fits well with a laminar flow model, assuming no slip conditions, where the Reynolds number is Re≈4·10$^{-4}$. For example, FIG. 8B illustrates derived two-dimensional mean x-velocity map, averaged over x (y-z cross-section). FIGS. 8C and 8D illustrate one-dimensional slices from FIG. 8B, showing mean x, y and z velocities. As predicted by a laminar flow model, the mean x velocity 861 has a parabolic profile, whereas they and z velocities 862 are negligible by comparison.

In some embodiments, various quantities of interest are obtained by a quantitative analysis of the measured bead trajectories. For example, by analyzing mean-squared-displacement (MSD) curves in they and z directions (e.g., orthogonal to the flow), a mean diffusion coefficient of 1.20±0.13 (1.24±0.19) µm$^2$/sec in they (z) direction is inferred. This compares well with the theoretical value given by the Einsteing-Smoluchowski relation for a 200 nm spherical diffuser in water of 1.08±0.03 µm$^2$/se. And, from the MSD curve intercepts, the localization precision is approximated. The resulting derived precisions are 76 nm (87 nm) in they (z) estimation, in some embodiments.

To generate a 3D velocity profile, the microfluidic channel is imaged under the input facet where the bead solution enters the microfluidic channel. The beads are then imaged as they enter the channel, thereby exhibiting considerable flow also in the z direction.

Figure 9B:
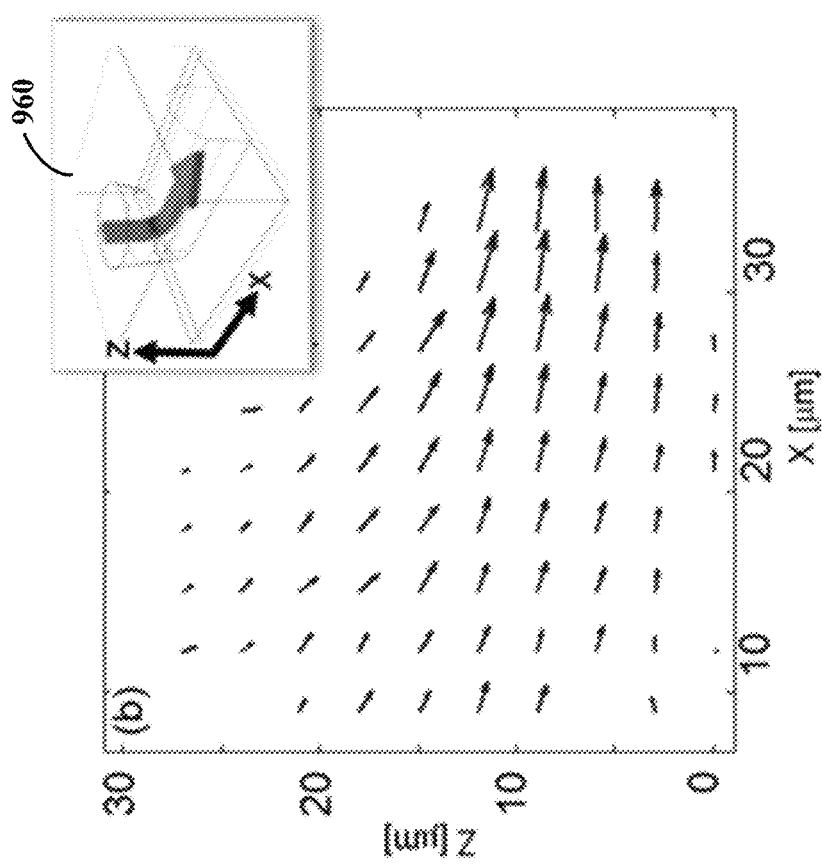
FIGS. 9A-9B illustrate examples of a three dimensional image generated using an apparatus, in accordance with various embodiments.
Figure 9A:
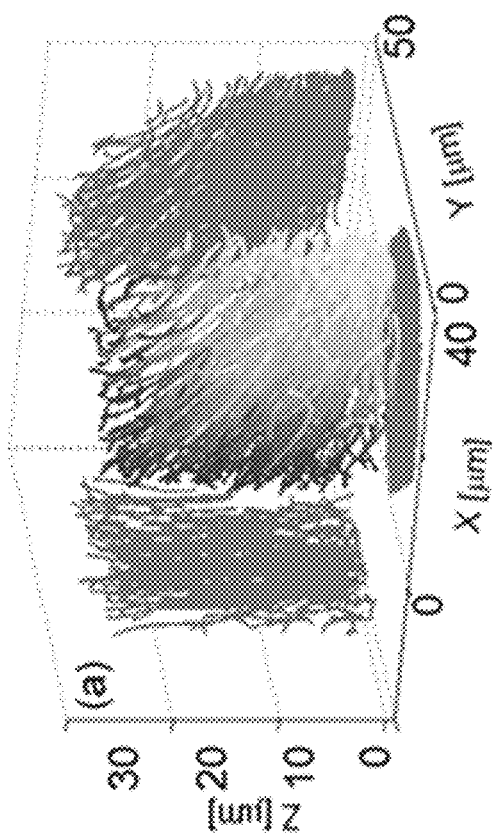

FIGS. 9A-9B illustrate examples of a three dimensional image generated using an apparatus, in accordance with various embodiments. For example, FIGS. 9A-9B show the resulting flow profile obtained using an apparatus comprising the microfluidic device with a microscope and/or imaging device. FIG. 9A illustrates three-dimensional trajectories of one-hundred beads, with shade coding normalized per trajectory start (dark=first frame in trajectory) to end (light=last frame in trajectory). A typical trajectory lasts around 1.5 seconds. FIG. 9B shows an x-z cross-section of the flow, near the center of the channel (in y) as illustrated by the inset 960. The flow is profiled over around 30 µm in z. The data is binned in 3×3×3 µm³ x-y-z bins, arrow length linearly encodes velocity (longest arrow corresponds to 22.5 µm/sec).

In some embodiments, several factors contribute to localization error in the described flow analysis. One factor is signal-to-noise ratio, determined by the finite number of signal photons relative to background photons. However, in a number of embodiments, the measured beads are bright (number of signal photons per frame on the order of around 100,000), and the background is low (a few photons per pixel) such that this is not a major contributor to the localization error. Motion blur is another cause for localization error. However, in some embodiments, this is not a major contributor to the localization error since the exposure time (5 ms) is short as compared to light velocities and diffusion rates of the measured beads.

Another contribution to localization error comes from model mismatch. Model mismatch occurs when the model to which each measured PSF is fit deviates from the actual modified PSF. This is partly because of aberrations in the optical apparatus, and because of aberrations related to refractive index mismatch. The PSF of a point source (bead) in water is somewhat different from the PSF of a bead on a cover-slip, and therefore difficult to calibrate. In accordance with various embodiments, the imaging model does include the effect of refractive index mismatch. The use of sophisticated numerical models and possibly calibration methods, decreases the localization error that accompanies these kinds of measurements.

Figure 10B:
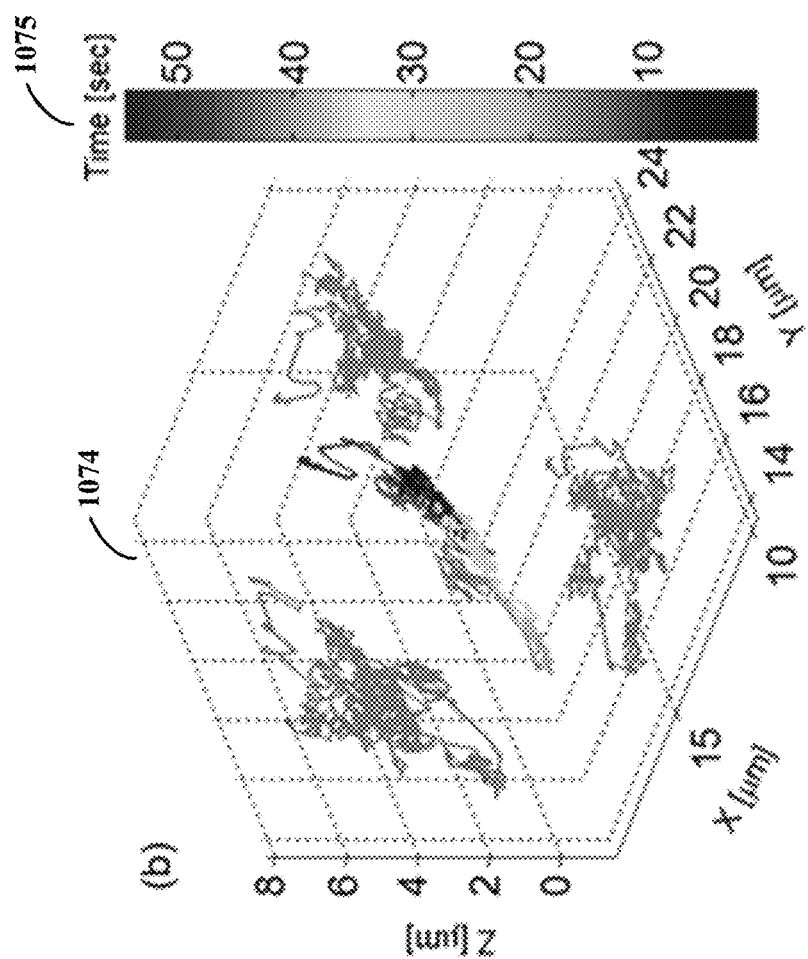
FIGS. 10A-10B illustrate an example of tracking an object in three-dimensions using an apparatus, in accordance with various embodiments.
Figure 10A:
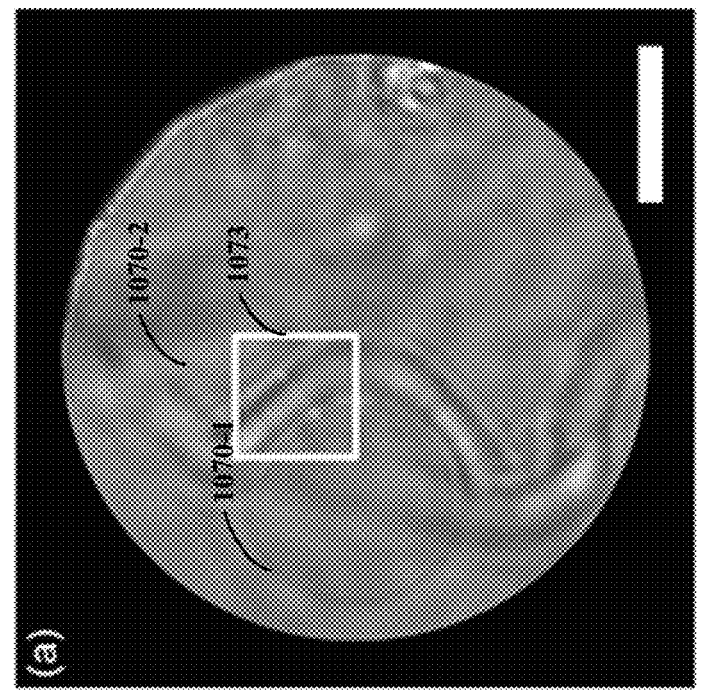

FIGS. 10A-10B illustrate an example of tracking an object in 3D using an apparatus, in accordance with various embodiments. For example, the tracking includes 3D tracking of a Quantum dot-labeled phosphoethanolamine (PE) lipid (e.g., 1070-1, 1070-2) on the surface of a live HeLa cell.

FIG. 10A, for example, illustrates a brightfield impression with overlayed fluorescence channel (one 50 ms frame), showing a signal from a quantum-dot-labeled PE lipid. The scale bar, as illustrated, includes 10 µm. FIG. 10B illustrates an inferred 3D trajectory 1074 as a function of time (greater than 50 seconds total), shade-coded with time progression 1075, and planar projections of the motion shown in gray on each of the bounding surfaces. The total motion over an axial range of greater than 5.5 µm is mapped. A maximum-likelihood estimation on a frame-by-frame basis produces the trajectory, in various embodiments.

In some embodiments, PSF optimization is used to analyze biological phenomena by performing 3D tracking of nanoscale objects using an optical apparatus. For example, a phase mask is optimized for a 6 µm z-range to track the diffusive motion of single lipid molecules in a live cell membrane. FIG. 10A shows an example frame from a tracking analysis following the motion of a quantum-dot labeled phosphoethanolamine (PE) lipid 1070-1, 1070-2 on the surface of a living HeLa cell. The extracted 3D trajectory is plotted as illustrated by FIG. 10B. The mean number of detected signal photons per frame is around 10,000, with a mean background of around 40 photons per pixel. The precision in this measurement is estimated to be 10 nm in the x-y coordinates and 17 nm in the z coordinate. This is measured by localizing immobilized quantum dots on the surface of the sample's cover-slip and averaging the standard deviation in localization, for several defocus values.

In various embodiments, the 3D trajectory of the molecule tracked in FIGS. 10A-10B is constrained to an approximately spherical surface. The sphere that the trajectory outlines is visible in a white light image 1073, as illustrated by FIG. 10A, and can be a detached bleb from a nearby cell, pressed against the cell membrane from the outside. When fitting the molecule's trajectory to a sphere, the radius corresponds with the value obtained from the white light image 1073. While the example embodiment in FIGS. 10A-10B show a single tracked molecule, PSF-engineering tracking allows for simultaneous tracking of multiple emitters.

In various embodiments, the PSFs are applicable to single-molecule localization microscopy. In some embodiments, single fluorescent dye molecules (Alexa Fluor 647) are immobilized on a cover-slip. The molecules are excited and their fluorescence is measured, using a 6 µm (tetrapod) PSF. Each molecule's position is then localized repeatedly. This is repeated for various defocus values throughout a 7 µm z-range. For a mean number of around 6000 detected signal photons and around 38 background photons per pixel, the mean statistical localization precision, namely the standard deviation of localizations, averaged over the entire z-range, is 15 nm, 12 nm and 29 nm in x, y and z, respectively.

Various embodiments include an imaging modality based on optimized tetrapod PSFs, capable of high-precision imaging throughout a tunable axial range. For example, large-axial-range tracking in a microfluidic device is performed, tracking under biological conditions of a Qdot-labeled molecule diffusing on the membrane surface of live mammalian cells, as well as single-fluorophore localization capabilities over a 7 µm axial range. Thereby, the tetrapod PSF is used to perform high-precision, scan-free tracking of multiple emitters over an exceptionally large z-range.

As previously discussed, an imaging model is used by the circuitry. The imaging model is based on scalar diffraction theory of light from a point source (i.e. polarization effects are not included), which yield simulations results that match experimentally obtained data. For a description of more detailed modeling considerations, refer to FIG. 2.

The optical model consists of a two-layer experimental system consisting of water (refractive index $n_1=1.33$), and glass/immersion oil (which have matched refractive index of $n_2=1.518$). Light from a single emitter in the sample acquires a phase factor (i.e. defocus) determined by the distance between the emitter and the interface separating layer 1 and layer 2 ($z_1$) and the distance between the microscope focal plane and the interface ($z_2$). An additional phase factor P is imposed by the phase mask—which, by virtue of the 4f system, is modeled as being located within the pupil of the apparatus objective. For a given emitter, the overall phase $\psi_{pupil}$ of light at a given point $\{x',y'\}$ within the apparatus pupil is given by the equation:

$$\psi_{total}(x', y') = P(x', y')e^{ikn_1 z_1 \sqrt{1-x'^2-y'^2} + ikn_2 z_2 \sqrt{1-\frac{n_1}{n_2}(x'^2+y'^2)}} \quad (3)$$

Note that if the interface is between the focal plane and the emitter, the sign of $z_2$ is positive. If the interface is closer to the objective lens than the focal plane, $z_2$ is negative. In this expression, a coordinate system is used that is normalized such that points along the circle $\sqrt{x'^2+y'^2}=N.A./n_2$ lie on the outer edge of the tetrapod phase mask. Due to the objective, the electric field of light along the outer edge of the microscope pupil has a greater amplitude than light close to the center of the pupil. This amplitude factor $A_{pupil}$ is given by:

$$A_{pupil}(x', y') = \begin{cases} \left(\dfrac{1}{1-x'^2-y'^2}\right)^{\frac{1}{4}} & \text{if } \sqrt{x'^2+y'^2} \le n_1/n_2 \\ 0 & \text{otherwise} \end{cases} \quad (4)$$

Using the imaging model, the region of non-zero amplitude is limited to points inside the circle $\sqrt{x'^2+y'^2}=n_1/n_2$, due to the fact that super-critical light, inhabiting the region $n_1/n_2 < \sqrt{x'^2+y'^2} = N.A./n_2$ is attenuated for objects (e.g., emitters) which are an appreciable distance ($\Delta < z_1$) from the interface. After light has propagated beyond the objective, paraxial approximations are valid. Specifically, the tube lens of the microscope performs an optical Fourier transform operation. The electric field present at a point (u, v) in the microscope's image plane, ($E_{img}$) is given by the formula:

$$E_{img}(u,v)=FT\{A_{pupil}(x',y')\psi_{pupil}(x',y')\}=FT\{E(x',y';x,y,z)P(x',y')\}, \quad (5)$$

where E(x',y') is the Fourier-plane electric field mentioned in Eq. 1. The intensity within the image plane is then:

$$I_{img}(u,v)=E_{img}(u,v)E^*_{img}(u,v). \quad (6)$$

Finally, object-space coordinates (x, y) are related to image-space coordinates (u, v) by a scaling factor M, the overall magnification of the microscope.

The optimization procedure is based on a CRLB minimization method. The objective function being minimized is the mean CRLB in x, y and z, over a predetermined z-range composed of N distinct z (depth) values. In various embodiments, the optimization is performed over the set of the first 55 Zernike polynomials, so that the sought solution is a coefficient vector $c \in R^N$ with N=55. The mathematical optimization problem, solved using Matlab's fmincon function, using the 'interior point' method, is therefore:

$$\min_c \sum_{j=\hat{x},\hat{y},\hat{z}} \sum_{z \in Z} \sqrt{\dfrac{1}{I_{jj}(c,z)}}, \quad (7)$$

where, assuming additive Poisson noise and a constant background of $\beta$, the Fisher information matrix for a point source along the optical axis is given according to Eq. 8 by:

$$I(c;0,0,z) = \sum_{k=1}^{N_p} \dfrac{1}{\mu_{c,z}(k)+\beta} \left(\dfrac{\partial \mu_{c,z}(k)}{\partial \theta}\right)^T \left(\dfrac{\partial \mu_{c,z}(k)}{\partial \theta}\right). \quad (8)$$

Here, $\theta=(x, y, z)$ is the 3D position of the emitter, summation is performed over the sum of image pixels $N_p$, and $\mu_{c,z}$ is a model of the detected PSF for an emitter at z, including the total number of signal photons per frame, magnification and pixelation, for a PSF produced by a Fourier-plane mask P(x', y') defined by:

$$P(x',y')=\text{circ}(r/R)\cdot\exp(iD_{zer}\cdot c) \quad (9)$$

where $r=\sqrt{x'^2+y'^2}$, R is the radius of the pupil plane, $$\text{circ}(\eta) = \begin{cases} 1, & \eta < 1 \\ 0, & n \ge 1 \end{cases},$$

and $D_{zer}$ is the linear operator transforming the vector of Zernike coefficients to the 2D phase pattern to be projected on the SLM. The SLM is discretized to a 256×256 grid, so that $D_{zer} \in R^{256^2 \times 55}$, where each column is a vector-stacked 2D image of the corresponding Zernike polynomial.

A set of tetrapod PSFs with z-ranges throughout the 2-20 μm range is derived by running the optimization procedure iteratively. Starting with a design z-range of 2 μm, the procedure is run once to produce an optimal PSF. Then, the output solution is used as an initial point for another iteration, with a larger z-range of 4 μm. This iterative process is repeated, iteratively increasing the z-range by 2 μm each time, to a final z-range of 20 μm.

FIGS. 11A-11B illustrate examples of a tetrapod PSF in different z-ranges, in accordance with various embodiments. The design range (z-range) has an effect on the resulting optimal tetrapod mask as illustrated by FIG. 11B. For example, the larger the z-range, the more extreme the phase 1181 peaks and valleys in the Tetrapod mask. FIG. 11A illustrates the z-range 1180-1, 1180-2, 1180-3, 1180-4, 1180-5 and FIG. 11B illustrates the resulting optimized tetrapod phase masks 1182-1, 1182-2, 1182-3, 1182-4, 1182-5 designed for z-ranges varying from 4-20 um.

Figure 12:
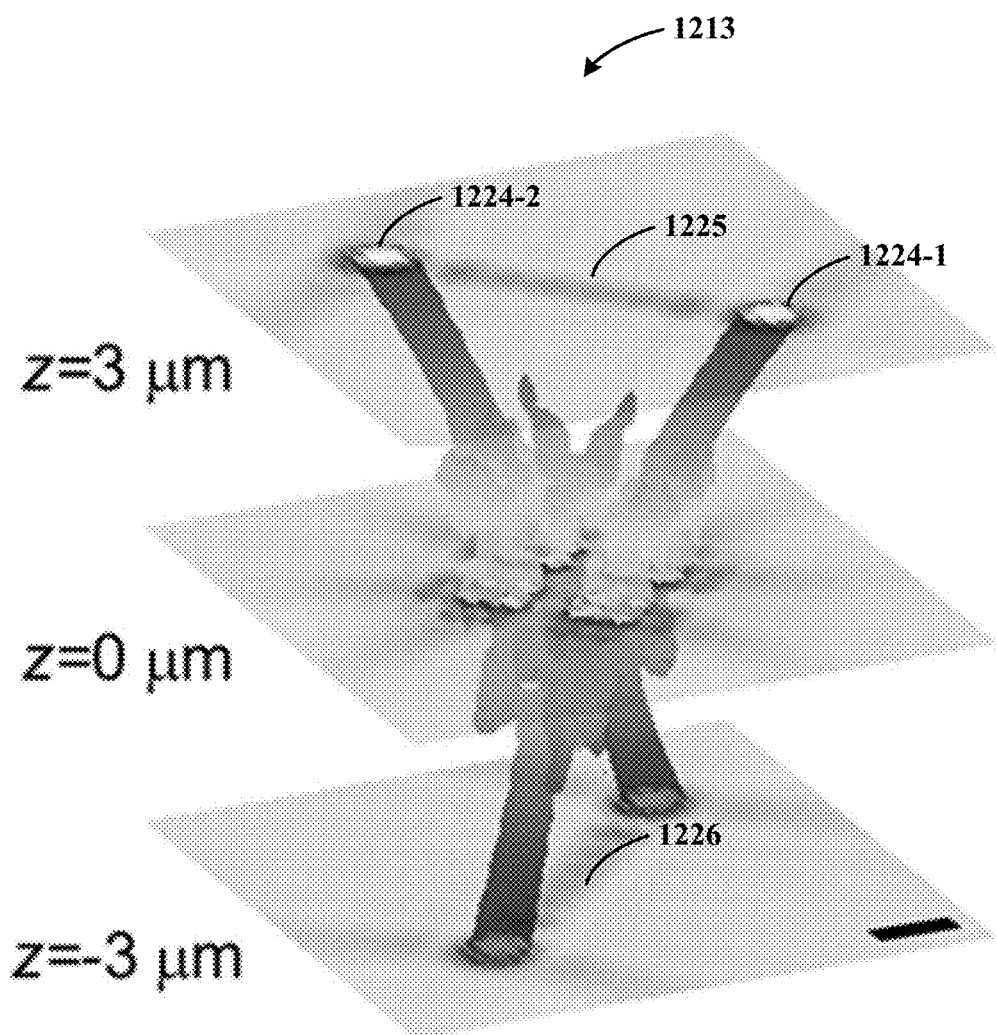
FIG. 12 illustrates an example three-dimensional tetrapod point spread function, in accordance with various embodiments.

FIG. 12 illustrates an example 3D rendering of a tetrapod PSF, in accordance with various embodiments. For instance, the 3D rendering of the tetrapod PSF 1213 includes a 6 um tetrapod PSF image plane intensity as a function of the emitter's axial position away from the focal plane (at z=0). The intensities making up the 3D shape are thresholded for visibility. Three slices of the PSF are shown with no thresholding (at z=−3,0,3 μm), displaying the full dynamic range of intensity. The scale bar is 1 μm. As illustrated, the PSF is created by 2 lobes 1224-1, 1224-2 moved along a first line 1225 above the focal plane, turned 90 degrees, and moved along a second line 1226 below the focal plane. The second line 1226 is perpendicular to the first line 1225. Accordingly, in some embodiments, the modified tetrahedral shape is a characterization of light having two lobes with a lateral distance that changes along a line, having a first orientation, as a function of an axial proximity of the object to the focal plane, and the line having a different orientation depending on whether the object is above or below a focal plane (e.g., two lines from the center to two lobes 1224-1, 1224-2 orientated along a first line 1225 when the object is above the focal plane and two lines from the center to the two lobes oriented along a second line 1226 when the object is below the focal plane, the second line 1226 being perpendicular to the first line 1225).

As the z-range of the tetrapod PSF is increased, the mean resulting CRLB throughout a 20 μm range decreases (by definition of the optimization problem), and this is indicative of mean precision enhancement. However, the overall mean improvement comes at a (local) cost as the CRLB around the focus is increased. This result is shown in FIG. 13, where the calculated z-CRLB is plotted as a function of z position of the emitter for different tetrapod mask designs covering z-ranges between 4 and 20 μm.

The calculation is for 3500 signal photons and background of 50 photons per pixel, and a wavelength of 670 nm. For optimal results, the tetrapod phase mask matches the range of the problem. For example, using a 20 μm PSF for tracking within a 6 μm thick sample yields sub-optimal precision.

Figure 13:
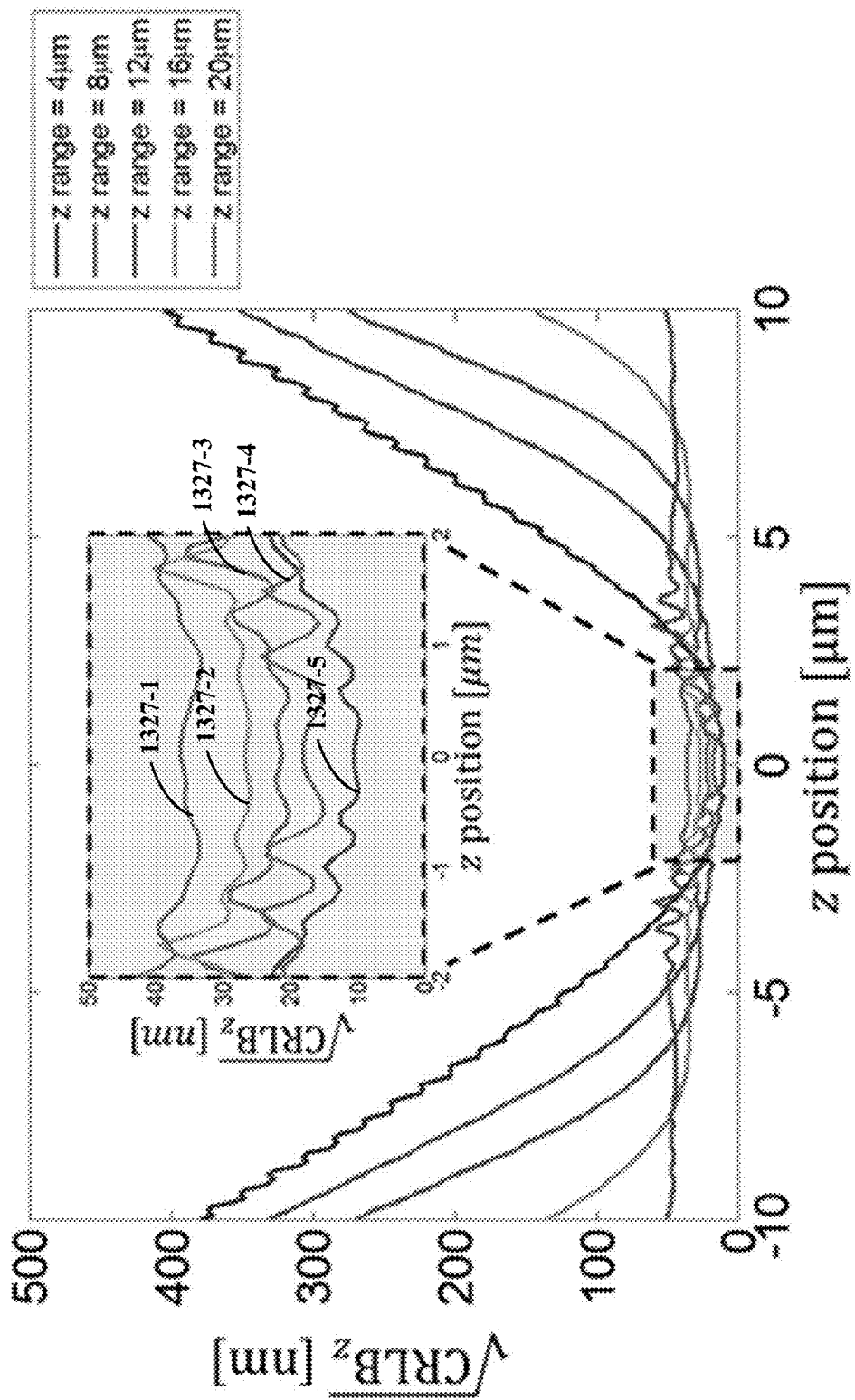
FIG. 13 illustrates an example precision of a tetrapod point spread function, in accordance with various embodiments.

FIG. 13 illustrates an example precision of a tetrapod PSF, in accordance with various embodiments. For example, the graph of FIG. 13 illustrates tetrapod mask precision vs. z-range. For a signal photon number of 3500 and 50 mean background photons per pixel, the 20 μm tetrapod PSF exhibits theoretical z precision of around 50 nm throughout a 20 μm z-range, however this comes at the cost of poorer precision near the focal plane (see the inset). Therefore, tetrapod masks engineered for smaller z-ranges are more suitable for imaging thinner samples. For example, the precision is illustrated for a 20 μm z-range 1327-1, a 16 μm z-range 1327-2, a 12 μm z-range 1327-3, an 8 μm z-range 1327-4, and a 4 μm z-range 1327-5.

For the flow profiling experimental embodiments, such as using a microfluidic device, nano-pure water with 200 nm diameter fluorescent beads (FluoroSphere 625/645, Life Technologies), at a concentration of around 0.2-0.5 pM (roughly several beads per field of view) is flowed through a glass microfluidic channel (Micronit 0.3 μL thin bottom microreactor). The cross-section of the channel in the y-z plane is approximately a semicircle, with a radius of around 20 μm.

Figures 14A, 14B, 14C:
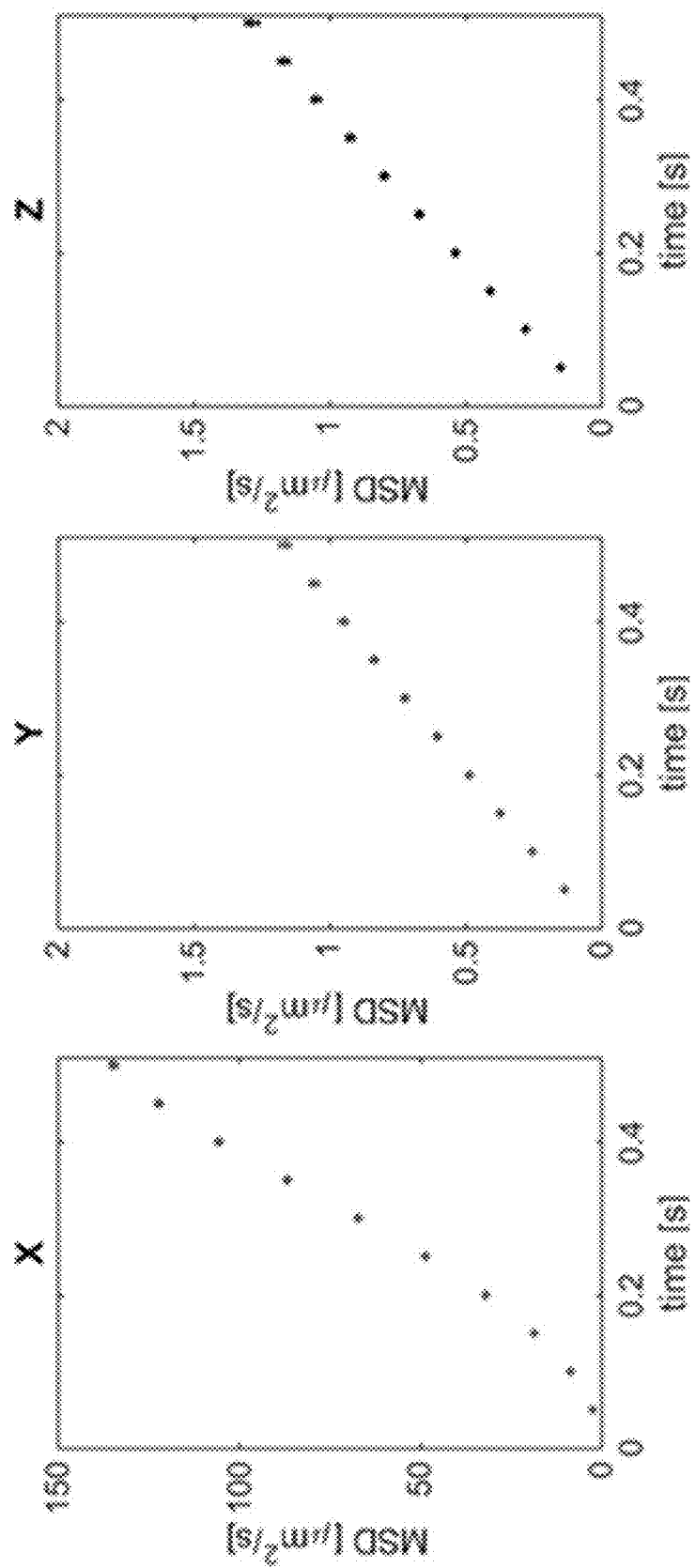
FIGS. 14A-14C illustrate examples of a mean-squared-displacement curve of a tetrapod point spread function, in accordance with various embodiments.

Constant-pressure-driven flow is maintained using a syringe pump (11 plus, Harvard Apparatus). Measurements, in various embodiments, are performed on an inverted microscope system (Olympus IX-71, objective lens 100×/NA 1.4 oil immersion UPlanSApo, Olympus) with custom widefield laser excitation (641 nm Coherent Cube) and equipped with an EMCCD image sensor (iXon+, DU 897-E, Andor). The microfluidic channel is placed in the inverted microscope system, on top of the oil immersion objective (See FIG. 5). The nominal focal plane of the objective for the laminar flow measurements is at z=12 μm (e.g., 12 μm inside the channel), and for the 3D flow measurement it is at z=12 μm FIGS. 14A-14C illustrate examples of a mean-squared-displacement curve of a tetrapod PSF of laminar flow, in accordance with various embodiments. The mean 3D velocity as a function of x,y,z is calculated by binning the 3D field of view into 2×2×2 μm³ voxels, and calculating the mean velocity of emitters within each bin. The mean velocity per bin is defined as:

$$v_b^i = \frac{1}{N}\sum_{n=1}^{N} v_n^i, \qquad (10)$$

where i=x, y, z, and $v_n^i$ is the instantaneous velocity of particle n out of the total N particles measured in bin b. The instantaneous velocity vector is defined as:

$$\bar{v}_n = \frac{[x(t+dt), y(t+dt), z(t+dt)] - [x(t), y(t), z(t)]}{dt}, \qquad (11)$$

where [x(t), y(t), z(t)] corresponds to the position of the particle at time t, and dt is the time difference between consecutive frames in which the particle was localized.

For the laminar flow measurement, statistical analysis is performed in order to extract the diffusion coefficient and to estimate localization precision. This is done by analyzing the mean squared displacement curves (MSD), shown in FIGS. 14A-14C. Linear fits with a constant offset term are extracted from the first three points (optimal number of MSD points is determined according to), where the slope is proportional to the diffusion coefficient and the intercept is a combination of static localization precision and the effect of a finite exposure duration.

FIG. 14A illustrates the x-direction, FIG. 14B illustrates the y direction, and FIG. 14C illustrates the z-direction MSD curves obtained from central 8 μm strip of a laminar flow measurement. The x-direction exhibits a parabolic profile, whereas the y and z-directions exhibit linear behavior, as expected from directed motion in the x direction in addition to 3D Brownian motion. Derived diffusion coefficient from y (z) direction=1.20±0.13 (1.24±0.19) μm²/sec, matching a calculated value by the Einstein-Smoluchowski relation of 1.09 μm²/sec. The y (z) localization error, estimated from the y-intercept, and accounting for finite exposure time (5 ms), is 75 (91) nm.

For experimental demonstrations of lipid tracking in the plasma membrane on the 3D cell surface, two different cell lines are used: 1. Plastic-adherent sub-clone of the PC12 cell line (rat adrenal gland pheochromocytoma, ATCC Number: CRL-1721.1) and 2. HeLa cells (human epithelial). Cells are grown at 37 degrees Celsius (C) in 5% $CO_2$, 95% relative humidity atmosphere in tissue-culture treated flasks (75 cm², BD Biosciences) in standard cell culture medium (10% fetal bovine serum (FBS), 90% phenol red free high-glucose Dulbecco's Modified Eagle's Medium (DMEM), both Gibco). Cells are grown to confluency and passaged every 2-3 days with 1:5 dilution two times prior to experiments. Cell passaging consists of a 5 minute incubation with 2 milliliter (ml) of trypsin replacement (TrypLE Express, Gibco), addition of 8 ml cell media to deactivate the enzyme, a brief centrifugation (1 minute, less than 400 relative centrifugal force (rcf)), followed by media replacement to remove any residual trypsin before transferring cells to a new flask. In preparation for imaging after the third passage, cell suspensions are added to microscopy coverslips in 6-well tissue culture plates (BD Biosciences). These coverslips (standard no. 1.5, Fisher) are pre-cleaned, ozone-treated and (for PC12 cells) coated with 500 ml of 8.4 mg/ml fibronectin (EMD Biosciences) in 1× phosphate buffered saline (PBS) (pH 7.4) for 1 hour, and rinsed with 1×PBS before use. Cells are attached on slides within a few hours and began to settle.

In various embodiments, cells are bulk-loaded with the lipid biotinyl-cap phosphoethanolamine (PE) (1,2-dioleoyl-sn-glycero-3-phosphoethanolamine-N-(cap biotinyl), Avanti Polar Lipids, 870273) by use of fatty-acid-free bovine serum albumin (BSA). A 100 micrograms (μg)/ml lipid stock solution in absolute ethanol is prepared and stored at 4 degrees C. Labeling of cells is carried out directly in a sample holder that holds a microscope coverslip below small (few ml) liquid volumes. Cells are loaded by diluting the lipid stock to 0.1-1 μg/ml in 0.1% fatty-acid-free BSA (Sigma Aldrich, A8806) to form complexes in Dulbecco's phosphate buffered saline (D-PBS) with 0.1 grams (g)/L CaCl2 and 0.1 g/L MgCl2 (Life Technologies, 14040) and incubating for 5 minutes at room temperature. Qdot labeling are subsequently performed by three washes of cells in D-PBS, followed by blocking for non-specific binding in D-PBS with 1% BSA for 1-2 minutes. Cells are brought in contact with a 1 nanometer (nM) filtered solution (using a 0.2 μm syringe filter) of the Qdot-655 streptavidin conjugate (Life Technologies, Q10123MP) in D-PBS with 1% BSA, for 2 minutes at room temperature. Further binding is blocked by addition of 1000 of 1 mM biotin and further incubation at room temperature for 2 minutes. Labeled cells are washed three times in D-PBS and imaged in warm (initially 37° C.) D-PBS supplemented with 1% BSA. The above procedure results in approximately 1-5 Qdot-labeled PE molecules per cell, an appropriate density for tracking.

For all cell tracking experimental embodiments, a 488 nm excitation source is used from an Ar+ ion laser, at a level of around 650 microwatts (μW) at the sample. For fluorescence filtering, a 488 nm dichroic mirror is used, combined with a 680/30 band-pass emission filter. The nominal focal plane of the objective lens is set at z=4.5 μm.

Figures 15A, 15B, 15C:
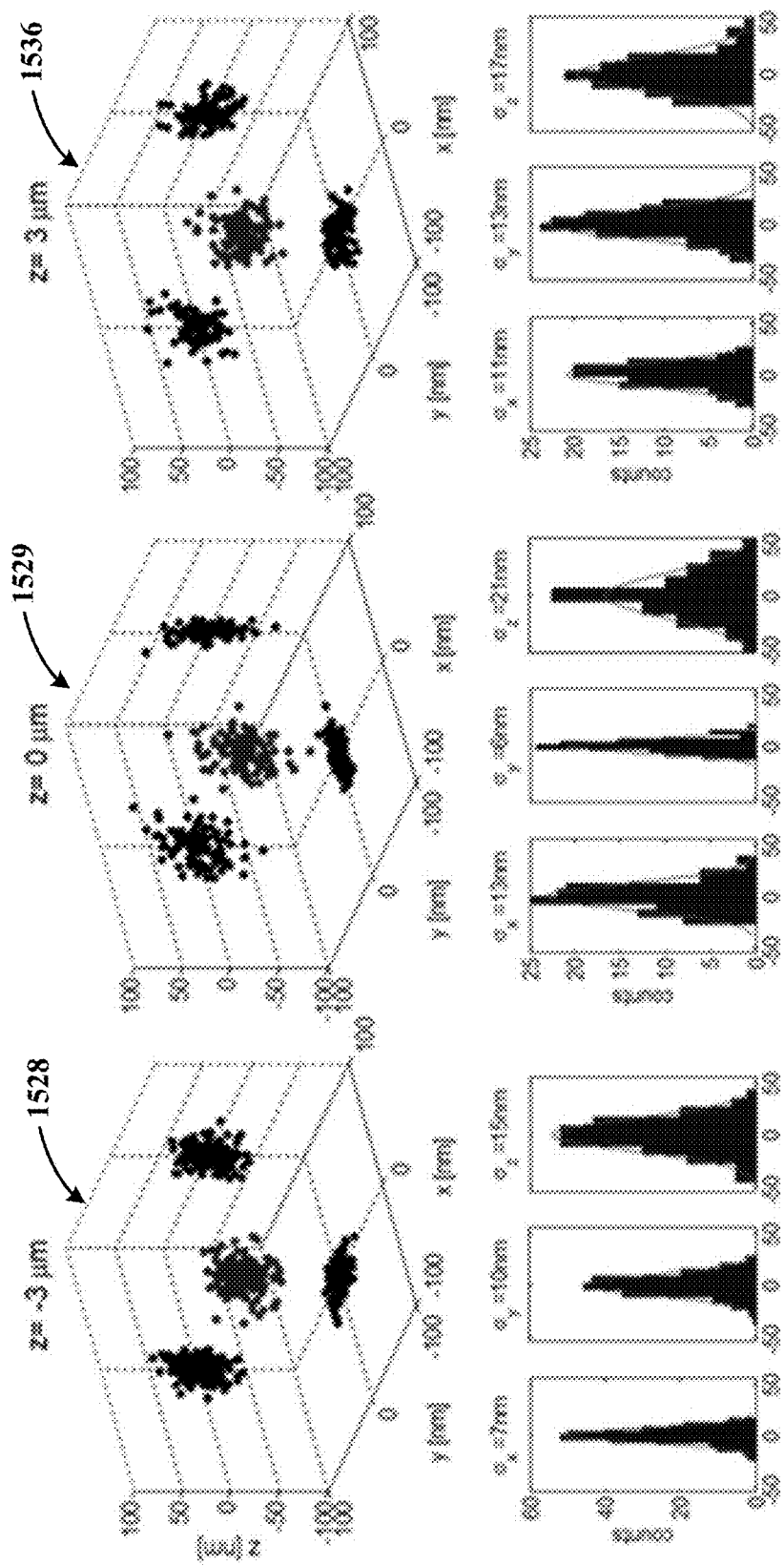
FIGS. 15A-15C illustrate examples of three-dimensional localization of an object using a tetrapod point spread function, in accordance with various embodiments.

FIGS. 15A-15C illustrate examples of 3D localization of an object using a tetrapod PSF, in accordance with various embodiments. To estimate the localization precision in the HeLa cell tracking experiment (e.g., FIGS. 10A-10B), immobilized Qdots are repeatedly localized on the surface of the cover slip of the same sample for tracking, at different defocus values. The mean number of detected signal photons per frame is around 10,000, with a mean background of around 40 photons per pixel. The mean precision is 10 nm in the x-y coordinates and 17 nm in the z coordinate.

For example, FIGS. 15A-15C illustrate the Qdots stuck to the HeLa cell cover slip surface repeatedly localized, for 3 objective defocus values: −3 μm (1528), 0 μm (1529), and 3 μm (1536). The localization scatter plots and histograms (Gaussian fits shown in red) are displayed for the three defocus values. Standard deviations are stated above the histograms.

Figure 16A:
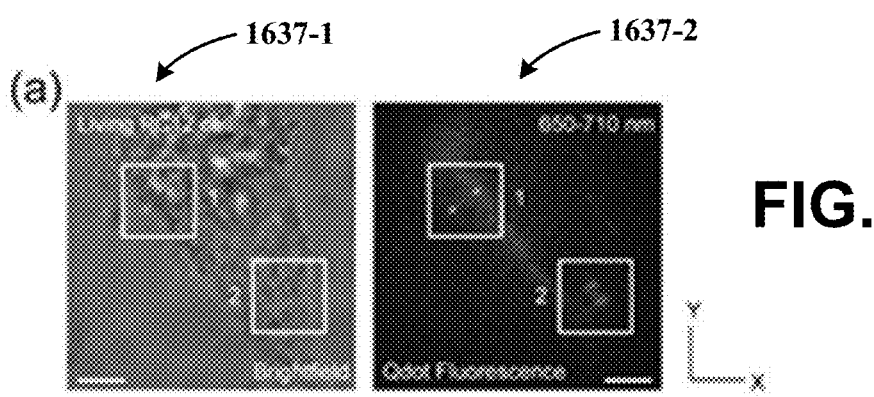
Figure 16B:
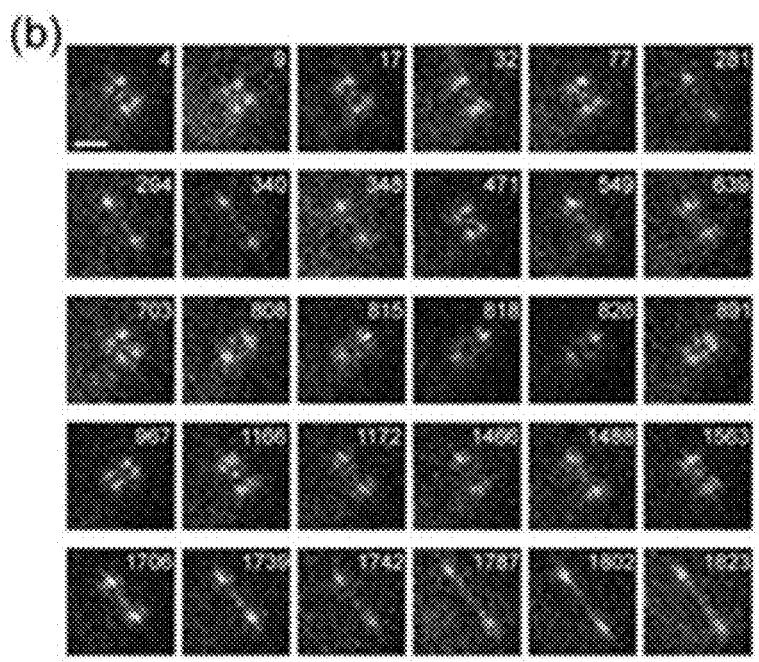

Additional tracking examples using a 6 μm Tetrapod mask are shown, featuring the 3D trajectories of multiple Qdot-labeled PE lipids diffusing in the plasma membrane of PC12 cells as illustrated by FIGS. 16A-16D and FIGS. 17A-17D FIGS. 16A-16D illustrate an example of 3D tracking of objects using a tetrapod PSF, in accordance with various embodiments. More specifically, FIGS. 16A-16D illustrate 3D tracking of Qdot-labeled phosphoethanolamine (PE) lipids on the surface of living PC12 cells. FIG. 16A illustrates a bright field transmission image 1637-1 (left) and corresponding area in the fluorescence channel 1637-2 (right, one 50 microsecond (ms) frame), showing signals from two fluorescent PE lipids (labeled 1 and 2). FIG. 16B illustrates examples of the evolving fluorescence image of lipid 2, indicating frame number in the image sequence of 1900 frames. Engineered shape changes by the optimized pupil plane phase design directly inform the x, y and z of the single emitter. FIG. 16C illustrates inferred 3D trajectories 1638-1 as a function of time (>90 seconds total), coded with time progression. The total diffusion over an axial range of greater than 3 μm is mapped for lipid 2, while simultaneously tracking, without any scanning, the position of lipid 1, which remains largely stationary at greater than 2 μm below lipid 2. Maximum-likelihood estimation on a frame-by-frame basis with respect to a reference library of image shapes as a function of z produces the trajectory. Separate trajectories 1638-2, 1638-3 of the two lipids are displayed below. FIG. 16D illustrates error histograms for x 1646-1, y 1646-2, z 1648-3 as standard deviation (std.) or statistical precision computed as the square root of the CRLB calculated from the slightly time-varying sets of recovered photon number, background and position of all localizations (both lipids) in the movie. Mean precision values are displayed. Scale bars are 5 μm (a) and 2 μm (b).

FIGS. 17A-17D illustrate an example of 3D tracking of objects using a tetrapod PSF, in accordance with various embodiments. More specifically, FIGS. 17A-17D illustrate simultaneous 3D three-emitter tracking of Qdot-labeled phosphoethanolamine (PE) lipids on the surface of a living PC12 cell. Tracking results for two lipids diffusing on the peripheral parts of a rounder cell in the settling phase combined with a third less mobile lipid (greater than 100 second observation, 2038 frames). The three lipids combined explore around 5 μm in z direction. FIG. 17A illustrates a brightfield impression 1752-1 (left) and corresponding area in the fluorescence channel 1752-2 (right, one 50 ms frame), showing signals from the three fluorescent PE lipids (labeled 1, 2, and 3). FIG. 17B illustrates inferred 3D trajectories 1753 (overview) and FIG. 17C illustrates detailed 3D trajectories 1754-1, 1754-2, 1754-3 shown individually as a function of time (around 100 seconds total), coded with time progression. FIG. 17D illustrates error histograms for x 1755-1, y 1755-2, z 1755-3 as standard deviation (std.) or statistical precision computed as the square root of the CRLB calculated from the slightly time-varying sets of recovered photon number, background and position of all localizations (all three lipids) in the movie. Mean precision values are shown. Scale bars are 5 μm.

Figure 18:
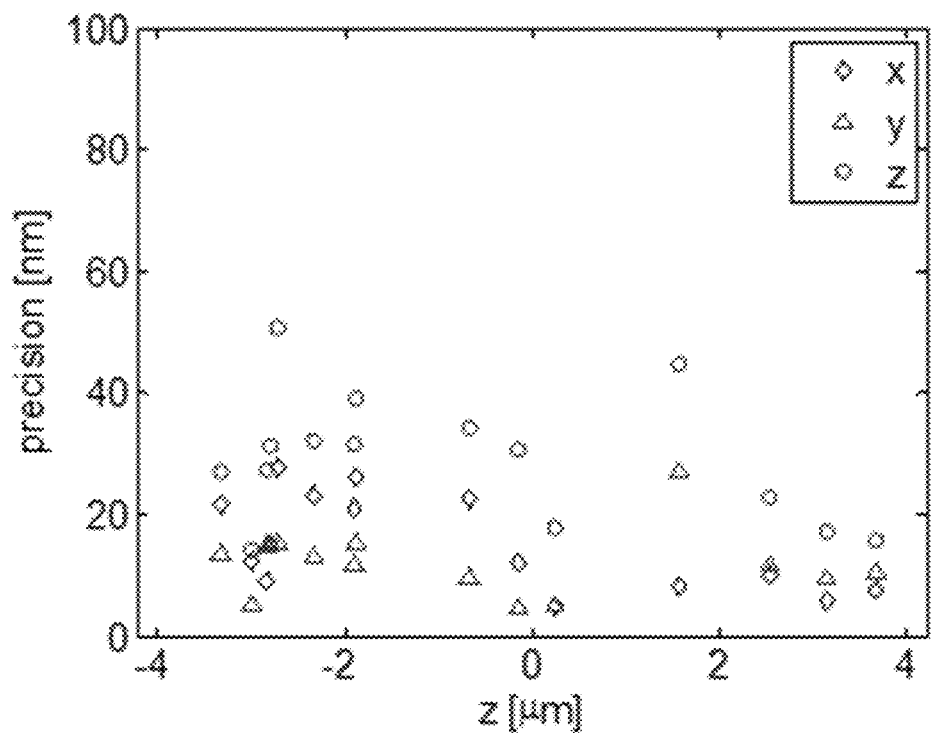
FIG. 18 illustrates an example of three-dimensional tracking of an object using a tetrapod point spread function, in accordance with various embodiments.

FIG. 18 illustrates an example of 3D tracking of multiple objects using a tetrapod PSF, in accordance with various embodiments. More specifically, FIG. 18 illustrates tracking of 15 single molecules that are repeatedly localized (around 75 frames for each molecule), and the x, y, z statistical localization precision is reported as a function of the z position of the objective (defocus value). To demonstrate the single-fluorophore localization capabilities of a 6 μm Tetrapod mask, Alexa Fluor 647 molecules are immobilized in PVA 0.3% on a clean microscope cover-slip (VWR No. 1.5, ozone-cleaned for 15 minutes). Single molecules are imaged (100 ms frames) and localized for various defocus values, throughout a 7 μm z-range. The mean signal number of photons is around 6000, and the mean background is around 38 photons per pixel. The mean precision, defined as the standard deviation over a mean number of 75 independent localizations per molecule, was (15,12,29) nm, in (x, y, z) respectively.

FIGS. 19A-19C illustrate an example of two phase masks optimized for 6 um used for two different wavelengths in accordance with various embodiments. For example, FIG. 19A illustrates a phase mask 1944 optimized for 6 um and corresponding PSFs 1956-1, 1956-2, 1956-3, 1956-4, 1956-5 across a 6 um z-range. In various embodiments, the phase mask design is used to create multiple phase masks. For example, two phase masks are implemented using the phase mask 1944 pattern for two different wavelengths (e.g., red and green colors) to localize objects in a sample that are labeled with different colors.

FIG. 19B illustrates the phase mask (bottom) and resulting fluorescent microsphere measurements (top) for a first wavelength (e.g., green) and FIG. 19C illustrates another phase mask (bottom) and resulting fluorescent microsphere measurements (top) for a second wavelength (e.g., red) across a 4 um z-range. In various embodiments, the different wavelengths are used to measure two different locations in a sample, such as DNA in a live yeast cells.

Various blocks, modules or other circuits may be implemented to carry out one or more of the operations and activities described herein and/or shown in the figures. In these contexts, a "block" (also sometimes "circuitry", "circuit", or "module") is a circuit that carries out one or more of these or related operations/activities (e.g., optimization, encoding an axial position, detect light, generate 3D image, or manipulate a phase mask). For example, in certain of the above-discussed embodiments, one or more modules are discrete logic circuits or programmable logic circuits configured and arranged for implementing these operations/activities. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. Also, although aspects and features may in some cases be described in individual figures, it will be appreciated that features from one figure or embodiment can be combined with features of another figure or embodiment even though the combination is not explicitly shown or explicitly described as a combination.

Terms to exemplify orientation, such as upper/lower, left/right, top/bottom, above/below, and axial/lateral (as well as x, y, and z), may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

Certain embodiments are directed to a computer program product (e.g., nonvolatile memory device), which includes a machine or computer-readable medium having stored thereon instructions which may be executed by a computer (or other electronic device) to perform these operations/activities.

Various embodiments are implemented in accordance with the underlying Provisional Application (Ser. No. 62/146,024) to which benefit is claimed and which is fully incorporated herein by reference. For instance, embodiments herein and/or in the provisional application (including the appendices therein) may be combined in varying degrees (including wholly). Reference may also be made to the experimental teachings and underlying references provided in the underlying provisional application, including the Appendices that form part of the provisional application. Embodiments discussed in the Appendices are not intended, in any way, to be limiting to the overall technical disclosure, or to any part of the claimed invention unless specifically noted.

The Appendices of the underlying Provisional Application are hereby fully incorporated by reference for their general and specific teachings. Appendix A entitled "Precise 3D scan-free multiple-particle tracking over large axial ranges with Tetrapod point spread functions", Appendix B entitled "Precise 3D scan-free multiple-particle tracking over large axial ranges with Tetrapod point spread functions", Appendix C entitled "Appendix C", and Appendix D entitled "Tetrapod Phase Mask Microscopy for high precision three-dimensional position estimation over a large, customizable depth range. Consistent with embodiments of the present disclosure, Appendices A, B, and D describe and show examples of optical apparatuses and use of the optical apparatuses to localize objects in three dimensions. Appendix C shows examples of localization of objects in three dimensions using an optical apparatus in accordance with various embodiments.

What is claimed is:

1. An apparatus comprising:
a phase mask configured and arranged with optics in an optical path to modify a shape of light, passed from an object by redirecting and modifying the light passing along the optical path to create a tetrapod point-spread function (PSF), wherein the shape modification characterizes the light as having two lobes with a lateral distance that changes along a line, having a first orientation, as a function of an axial proximity of the object to a focal plane, and with the line having a different orientation depending on whether the object is above or below the focal plane; and
circuitry configured and arranged to generate a three-dimensional image from light by using the redirected and modified shape of the light passing along the optical path to provide depth-based characteristics of the object.

2. The apparatus of claim 1, wherein the phase mask configured and arranged to modify the shape of light includes decreasing the lateral distance of the two lobes along the line as a function of the axial proximity of the object to the focal plane and wherein the phase mask is optimized for one of a depth range that is greater than 3 microns, and an application-specific depth that capable of being greater than 3 microns when imaging with a numerical aperture greater than 1.2.

3. The apparatus of claim 1, wherein the phase mask configured and arranged to modify the shape of light includes decreasing the lateral distance of the two lobes along the line when the object is closer to the focal plane and increasing the lateral distance when the object is further away from the focal plane.

4. The apparatus of claim 1, wherein the circuitry is configured and arranged to infer depth of portions of the object based on the modified shape and a degree of blur, and wherein the different orientation of the line includes a lateral turn of the line from the first orientation to the different orientation.

5. The apparatus of claim 1, wherein the circuitry is configured and arranged to infer depth of portions of the object based upon a tetrapod point-spread function (PSF), and wherein the PSF characterizes the light as the two lobes oriented along the line having the first orientation when the object is above the focal plane and the two lobes oriented along the line with a different orientation when the object is below the focal plane.

6. The apparatus of claim 1, wherein the circuitry includes an imaging circuitry at an image plane in the optical path and configured and arranged to detect light at or incident upon the imaging circuit.

7. The apparatus of claim 6, wherein the phase mask is configured and arranged with the optics to create the tetrapod PSF by moving two lobes toward one another along a first line when the object is above the focal plane, and turning the two lobes 90 degrees laterally and moving the two lobes apart from one another along a second line that is perpendicular to the first line and when the object is below the focal plane.

8. The apparatus of claim 1, wherein the apparatus includes a light-sheet illumination of the object and the optics configured and arranged to pass the signal light from the object toward a detection circuitry.

9. The apparatus of claim 8, wherein the optics is configured and arranged to provide tilted illumination of the object relative to the image plane.

10. The apparatus of claim 1, wherein the circuitry is configured and arranged to infer depth of portions of the object based on a Zernike polynomial.

11. The apparatus of claim 1, wherein the phase mask is configured and arranged to infer a depth characteristic thereof arising from light from the object at different respective depths at least one of which is greater than 3 microns and less than or equal to 20 microns.

12. The apparatus of claim 11, further including a tuning circuit configured and arranged to manipulate the phase mask to tune the depth characteristic.

13. The apparatus of claim 11, wherein the phase mask includes a deformable mirror configured and arranged to tune the depth characteristic by deforming.

14. The apparatus of claim 1, wherein the circuitry is configured and arranged to generate the three-dimensional image indicative of respective depths of portions of the object that are at least 3 microns from one another.

15. An apparatus comprising:
   a phase mask configured and arranged with optics in an optical path to modify a shape of light, passed from an object, wherein the shape modification characterizes the light as having two lobes with a lateral distance that changes along a line, having a first orientation, as a function of an axial proximity of the object to a focal plane, and with the line having a different orientation depending on whether the object is above or below the focal plane; and
   circuitry configured and arranged to generate a three-dimensional image from light by using the modified shape to provide depth-based characteristics of the object, wherein the circuitry is configured and arranged to infer depth of portions of the object based upon a three-dimensional shape of the object on an image plane and a location of a portion of the object from which the light is emitted, wherein the shape modification is not a rotation of the shape of the light.

16. A method comprising:
   providing optics and a phase mask in an optical path;
   passing light through the optical path to circuitry where the light is detectable; and
   encoding an axial position of an observed object by modifying a shape of the light passing along the optical pathway to create a tetrapod point-spread-function (PSF) at the circuitry using one or more parameterized phase masks, wherein the one or more parameterized phase masks is optimized for a target depth-of-field range for an imaging scenario.

17. The method of claim 16, wherein encoding an axial positon further includes localizing a particle in three-dimensions based on the modified PSF.

18. The method of claim 16, wherein passing the light includes passing a sheet of light through the object to illuminate a slice of the object, and further passing the signal light from the object through circuitry where the signal light is detectable.

19. The method of claim 16, further including tracking locations of multiple particles simultaneously based on the encoded axial position.

20. The method of claim 16, further including characterizing flow in three-dimensions in a microfluidic device.

21. The method of claim 16, further including optimizing the one or more parameterized phase masks for a depth range that is between 2 microns to 20 microns.

22. The method of claim 16, further including optimizing the one or more parameterized phase masks for an application-specific depth that is between 2 microns to 20 microns.

23. An apparatus comprising:
   an imaging circuit at an image plane in an optical path and configured and arranged to detect light at or incident upon the imaging circuit;
   optics configured and arranged to pass light from an object toward the image plane;
   a phase mask configured and arranged with the optics to modify a shape of light passing along the optical path, passed from the object, wherein the shape of the light passing along the optical path is redirected and modified to create a tetrapod point-spread-function (PSF), wherein the shape modification characterizes the light as having two lobes with a lateral distance that changes along a line, having a first orientation, as a function of an axial proximity of the object to a focal plane, and with the line having a different orientation depending on whether the object is above or below the focal plane; and
   circuitry configured and arranged to generate a three-dimensional image from the light detected via the imaging circuit, by using the modified shape to provide depth-based characteristics of the object.

24. The apparatus of claim 23, wherein the apparatus includes a tilted light-sheet illumination relative to the imaging plane and the optics are further configured and arranged to pass light from the object toward the detection circuitry.

* * * * *